United States Patent
Okuyama et al.

(10) Patent No.: US 10,910,164 B2
(45) Date of Patent: Feb. 2, 2021

(54) BIAXIALLY STRETCHED POLYPROPYLENE FILM FOR CAPACITORS, METALLIZED FILM, AND CAPACITOR

(71) Applicant: OJI HOLDINGS CORPORATION, Tokyo (JP)

(72) Inventors: Yoshimune Okuyama, Kusatsu (JP); Yoshikazu Fujishiro, Ichikawa (JP); Masahiro Nakata, Konan (JP); Tadakazu Ishiwata, Konan (JP); Akihiro Kakehi, Kusatsu (JP)

(73) Assignee: OJI HOLDINGS CORPORATION, Tokyo (JP)

( * ) Notice: Subject to any disclaimer, the term of this patent is extended or adjusted under 35 U.S.C. 154(b) by 189 days.

(21) Appl. No.: 15/562,739

(22) PCT Filed: Mar. 31, 2016

(86) PCT No.: PCT/JP2016/060854
§ 371 (c)(1),
(2) Date: Sep. 28, 2017

(87) PCT Pub. No.: WO2016/159330
PCT Pub. Date: Oct. 6, 2016

(65) Prior Publication Data
US 2018/0082791 A1 Mar. 22, 2018

(30) Foreign Application Priority Data

Mar. 31, 2015 (JP) ................... 2015-073298
Mar. 31, 2015 (JP) ................... 2015-073300

(51) Int. Cl.
*H01G 4/33* (2006.01)
*H01G 4/18* (2006.01)
(Continued)

(52) U.S. Cl.
CPC .................. *H01G 4/33* (2013.01); *C08J 5/18* (2013.01); *C08L 23/12* (2013.01); *H01G 4/14* (2013.01);
(Continued)

(58) Field of Classification Search
CPC ... H01G 4/33; H01G 4/14; H01G 4/18; C08L 23/12; C08L 2203/16; C08J 5/18; C08J 2323/12; B29C 55/12
See application file for complete search history.

(56) References Cited

U.S. PATENT DOCUMENTS 7,241,507 B2 7/2007 Kliesch et al.
8,804,308 B2 8/2014 Grosrenaud et al.
(Continued)

FOREIGN PATENT DOCUMENTS

CN 103137325 A 6/2013
JP 3-70113 A 3/1991
(Continued)

OTHER PUBLICATIONS

Communication dated Jul. 6, 2018 issued by the State Intellectual Property Office of People's Republic of China in counterpart application No. 201680019601.4.
(Continued)

*Primary Examiner* — Nathan L Van Sell
(74) *Attorney, Agent, or Firm* — Sughrue Mion, PLLC

(57) ABSTRACT

The present invention relates to a biaxially stretched polypropylene film for capacitor. The biaxially stretched polypropylene film for capacitor of the present invention can suppress an increase in tan δ and a decrease in the electrostatic capacitance even when the capacitor is used at a high voltage and an elevated temperature for a long duration.

10 Claims, 1 Drawing Sheet

(51) Int. Cl.
*C08L 23/12* (2006.01)
*H01G 4/14* (2006.01)
*C08J 5/18* (2006.01)

(52) U.S. Cl.
CPC ............ *H01G 4/18* (2013.01); *C08J 2323/12* (2013.01); *C08L 2203/16* (2013.01)

(56) References Cited

U.S. PATENT DOCUMENTS

| | | | |
|---|---|---|---|
| 2008/0102247 A1 | 5/2008 | Matsuo et al. | |
| 2013/0288000 A1 | 10/2013 | Ishiwata et al. | |
| 2014/0016244 A1* | 1/2014 | Monno | C08J 5/18 361/323 |
| 2015/0140266 A1 | 5/2015 | Ishiwata et al. | |

FOREIGN PATENT DOCUMENTS

| | | | | |
|---|---|---|---|---|
| JP | 2007-207884 A | 8/2007 | | |
| JP | 2008-133446 A | 6/2008 | | |
| JP | 2009-088492 A | 4/2009 | | |
| JP | 2011-122142 A | 6/2011 | | |
| JP | 2011-148896 A | 8/2011 | | |
| JP | 2012-149171 A | 8/2012 | | |
| JP | 2013-209641 A | 10/2013 | | |
| JP | 2014-077057 A | 5/2014 | | |
| JP | 2014114419 A | 6/2014 | | |
| JP | 2014205799 A | 10/2014 | | |
| JP | 2014-231584 A | 12/2014 | | |
| WO | WO-2012121256 A1 * | 9/2012 | ............... | C08J 5/18 |
| WO | 2013105552 A1 | 7/2013 | | |

OTHER PUBLICATIONS

International Preliminary Report on Patentability (Chapter 11) dated Oct. 5, 2017 issued by the International Bureau in No. PCT/JP2016/060854.
International Search Report for PCT/JP2016/060854 dated Jun. 14, 2016.
Communication dated Nov. 22, 2018 from the European Patent Office in application No. 16773210.6.
English translation of Publication CN 103137325A, published Jun. 5, 2013 (original submitted Aug. 31, 2018).

* cited by examiner

BIAXIALLY STRETCHED POLYPROPYLENE FILM FOR CAPACITORS, METALLIZED FILM, AND CAPACITOR

TECHNICAL FIELD

This application is a National Stage of International Application No. PCT/JP2016/060854 filed Mar. 31, 2016, claiming priority based on Japanese Patent Application No. 2015-073298 filed on Mar. 31, 2015 and Japanese Patent Application No. 2015-073300 filed on Mar. 31, 2015, the entire contents of which are incorporated by reference herein.

The present invention relates to a biaxially stretched polypropylene film for capacitor, specifically a biaxially stretched polypropylene film for capacitor which exhibits a small decrease in electrostatic capacitance in a long-term voltage tolerance test at an elevated temperature.

BACKGROUND ART

Conventionally, a polypropylene film has been widely used in electronics such as a film capacitor, due to its superior electrical properties such as dielectric loss (sometimes referred to as tan δ hereinafter) and voltage resistance compared to other plastic films. However, a polypropylene film typically has a poor heat resistance and is not suitable for a capacitor used at an elevated temperature. In addition, the electrostatic capacitance decreases over time during long-term use. Thus, there are demands for further improvement in voltage resistance.

In Patent Document 1, the object is to improve heat resistance and voltage resistance, and a biaxially stretched polypropylene film for capacitor having a controlled surface roughness, convexities height and convexities population on both surfaces of the polypropylene film, thereby achieving an improved voltage resistance and better element processability, is proposed.

In Patent Document 2, a biaxially stretched polypropylene film for capacitor using a polypropylene resin raw material having a certain mesopentad fraction, weight average molecular weight and molecular weight distribution is proposed.

In Patent Document 3, a polypropylene film having a rough surface and including a polypropylene resin having a certain weight average molecular weight as a major component is proposed.

In Patent Document 4, as a result of studying a relationship between an internal structure of a polypropylene film and a leakage current when a high voltage is applied, a biaxially stretched polypropylene film for capacitor is proposed, in which voltage resistance of a polypropylene film is improved by reducing the crystallite size and highly orienting the film.

In Patent Document 5, a polypropylene film for a capacitor, in which a polypropylene film having a heat shrinkage in a certain range, is proposed. The polypropylene film has a small decrease in electrostatic capacitance at an elevated temperature and during a long-term electricity application, and stable tan δ characteristics.

Patent Document 1: JP-2011-A-122142

Patent Document 2: JP-2012-A-149171

Patent Document 3: JP-2014-A-77057

Patent Document 4: JP-2014-A-231584

Patent Document 5: JP-2009-A-88492

SUMMARY OF INVENTION

Technical Problem

Patent Document 1 to 3 disclose that fine and uniform roughness of the surface topography of the polypropylene film achieved via reduction in the number of large convexities on the surface can provide the effect of improvement in dielectric breakdown strength and healing characteristics (security). However, the present inventors discovered that the electrostatic capacitance decrease that occurs during the long-term use at a high voltage and an elevated temperature is not sufficiently suppressed in all the polypropylene films described in the Patent Document 1 to 3.

Patent Document 4 discloses that a polypropylene film having a reduced crystallite size as well as higher degree of orientation can improve voltage resistance. However, the present inventors discovered that the electrostatic capacitance decrease that occurs during the long-term use at a high voltage and an elevated temperature is not sufficiently suppressed in the polypropylene film described above as well.

Patent Document 5 discloses a polypropylene film for a capacitor, in which a polypropylene film having a heat shrinkage in a certain range. The polypropylene film has a small decrease in electrostatic capacitance at an elevated temperature and during a long-term electricity application, and stable tan δ characteristics. However, the present inventors discovered that the electrostatic capacitance decrease that occurs during the long-term use at a high voltage and an elevated temperature is not sufficiently suppressed in the polypropylene film described above. Also, a relationship between the surface topography of the film and tan δ of the capacitor element was not considered in Patent Document 5.

Accordingly, the object of the present invention is to provide a biaxially stretched polypropylene film for capacitor that can suppress the decrease in electrostatic capacitance even when a high voltage is applied to the capacitor comprising a film at an elevated temperature for a long duration.

Solution to Problem

The present inventors conducted a diligent research with regard to suppression of the decrease in electrostatic capacitance that occurs when the capacitor is used at a high voltage and an elevated temperature for a long duration. Thus, the present inventors discovered that a polypropylene film that exhibits a longer delay in increase in tan δ of the capacitor element has a smaller change in the electrostatic capacitance ΔC (capacitance change) and a smaller decrease in the electrostatic capacitance as a function of time.

The dielectric loss tan δ of a capacitor element is constituted of a dielectric loss originating from the motion of polypropylene molecules which constitute the dielectric body and an electrode loss such as an electrical resistance of the electrode and a leakage current between electrodes. The present inventors discovered that the dielectric loss tan δ of the capacitor increases when both of these losses increase greatly during the long-term use of the capacitor at a high voltage and an elevated temperature, leading to a large capacitance loss and a poor long-term durability as well. The present inventors discovered that the increase in the dielectric loss tan δ of the capacitor element can be significantly suppressed when both of these losses of the capacitor element, the dielectric loss originating from motion of molecules and the electrode loss, are suppressed.

The present inventors conducted a diligent research to discover that the increase in dielectric loss of the capacitor element originating from the motion of molecules can be suppressed by a biaxially stretched polypropylene film, which has a crystallite size controlled to a certain size or smaller and birefringence relative to the thickness direction controlled to a certain range. Such a biaxially stretched polypropylene film may include one or more polypropylene resins having a certain range of molecular weight distribution or mesopentad fraction, for example.

Furthermore, the present inventors conducted a diligent research with regard to an effective surface topography for dielectric loss reduction in the capacitor element to discover that the surface topography characterized by a relatively small "elliptical shape density", a density of fine crater-like concavities and convexities (protrusions) formed on a surface in a shape such as a circle or an elliptical shape, and a large number of large convexities with relatively high convex height is preferred, for example. The characteristics of these surface topography greatly differ from the characteristics of the surface with a fine and uniform roughness and a larger number of elliptical shape convex with a smaller convexities height or the surface with a fine and uniform roughness and the reduced number of the large convexities for the improvement in dielectric breakdown strength and healing characteristics (security), disclosed in the conventional art such as Patent Document 1 to 4 described above.

As a result of studying the increase tan δ as a function of time, the present inventors discovered that a polypropylene film having a change rate over time of tan δ/tan $δ_0$ of $5.0 \times 10^{-4}$ [1/hour] or less can suppress the increase in tan δ of the capacitor element even when the capacitor is used at a high voltage and an elevated temperature for a long duration, leading to suppression of the decrease in the electrostatic capacitance, where tan δ/tan $δ_0$ is a value of tan δ normalized by a value of tan $δ_0$, tan δ [%] is a value measured at an elapsed time of between 0 hour and 500 hours, and tan $δ_0$ [%] is an initial value measured at an elapsed time of 0 hour, in a long-term durability test at 105° C. and under an applied voltage of 600 V. Thus, the present inventors completed the invention.

That is, the present invention includes the following:

[1] A biaxially stretched polypropylene film for capacitors having a change rate over time of tan δ/tan $δ_0$ of $5.0 \times 10^{-4}$ [1/hour] or less, wherein tan δ/tan $δ_0$ is a value of tan δ normalized by a value of tan $δ_0$, tan δ [%] is a value measured at an elapsed time of between 0 hour and 500 hours, and tan $δ_0$ [%] is an initial value measured at an elapsed time of 0 hour, in a long-term durability test at 105° C. and under an applied voltage of 600 V.

[2] The polypropylene film according to [1], wherein a total volume of convexities having a height of 0.4 μm or greater is 50 μm$^3$ or greater and 150 μm$^3$ or less per 1 mm$^2$ on at least one of the surfaces of the polypropylene film.

[3] The polypropylene film according to [1] or [2], wherein an elliptical shape density is 60/mm$^2$ or greater and 80/mm$^2$ or less on at least one of the surfaces of the polypropylene film.

[4] The polypropylene film according to any one of [1] to [3] having Δ(tan δ) of −10.0 or greater and 0.50 or less, wherein Δ(tan δ) is a difference obtained by subtracting a value of tan δ/tan $δ_0$ measured at an elapsed time of 1500 hour from a maximum of tan δ/tan $δ_0$ measured before an elapsed time of 1500 hours, and tan δ/tan $δ_0$ is a value of tan δ[%] measured at an elapsed time of 0 hour to 1500 hours normalized by a value of tan $δ_0$ [%] measured at an elapsed time of 0 hour in the long-term durability test.

[5] The polypropylene film according to [2] or [3], wherein the maximum height of convexities is 0.5 μm or greater and 1.0 μm or less on the at least one of the surfaces of the polypropylene film.

[6] The polypropylene film according to any one of [1] to [5], wherein the polypropylene film is a biaxially stretched film of a polypropylene cast sheet, in which a β-type spherulite is formed.

[7] The polypropylene film according to [6], wherein the polypropylene cast sheet has a β-crystal fraction of 5% to 30%.

[8] The polypropylene film according to any one of [1] to [7], wherein the polypropylene film has a thickness of 1.0 μm or greater and 6.0 μm or less.

[9] A metallized film including the polypropylene film described in any one of [1] to [8] and a metal coating on one or both surfaces of the polypropylene film.

[10] A capacitor including the metallized film described in [9].

[11] A use of a film as a film for a capacitor, the film having a change rate over time of tan δ/tan $δ_0$ of $5.0 \times 10^{-4}$ [1/hour] or less, wherein tan δ/tan $δ_0$ is a value of tan δ normalized by a value of tan $δ_0$, tan δ [%] is a value measured at an elapsed time of between 0 hour and 500 hours, and tan $δ_0$ [%] is an initial value measured at an elapsed time of 0 hour, in a long-term durability test at 105° C. and under an applied voltage of 600 V.

[12] A method for a use of a film as a film for a capacitor, the film having a change rate over time of tan δ/tan $δ_0$ of $5.0 \times 10^{-4}$ [1/hour] or less, wherein tan δ/tan $δ_0$ is a value of tan δ normalized by a value of tan $δ_0$, tan δ [%] is a value measured at an elapsed time of between 0 hour and 500 hours, and tan $δ_0$ [%] is an initial value measured at an elapsed time of 0 hour, in a long-term durability test at 105° C. and under an applied voltage of 600 V.

[13] A method of producing a biaxially stretched polypropylene film for capacitor having a change rate over time of tan δ/tan $δ_0$ of $5.0 \times 10^{-4}$ [1/hour] or less, wherein tan δ/tan $δ_0$ is a value of tan δ normalized by a value of tan $δ_0$, tan δ [%] is a value measured at an elapsed time of between 0 hour and 500 hours, and tan $δ_0$ [%] is an initial value measured at an elapsed time of 0 hour, in a long-term durability test at 105° C. and under an applied voltage of 600 V, the method sequentially including:

(1) heating a polypropylene resin composition;
(2) extruding a melted polypropylene resin composition obtained in step (1);
(3) bringing the polypropylene resin composition obtained in step (2) into contact with at least one metal drum; and
(4) stretching a cast sheet obtained in step (3) biaxially.

[14] The method according to [13], wherein the surface temperature of the at least one metal drum is maintained at from 90° C. to 140° C. in step (3).

[15] The method according to [13] or [14], wherein the method includes stretching the cast sheet at a temperature of 100 to 160° C. in step (4).

[16] A biaxially stretched polypropylene film for capacitor having the total volume of convexities having a height of 0.4 μm or greater of 50 μm$^3$ or greater and 150 μm$^3$ or less per 1 mm$^2$ on at least one of the surfaces of the polypropylene film, the polypropylene film having a change rate over time of tan δ/tan $δ_0$ of $5.0 \times 10^{-4}$ [1/hour] or less, wherein tan δ/tan $δ_0$ is a value of tan δ normalized by a value of tan $δ_0$, tan δ [%] is a value measured at an elapsed time of between 0 hour and 500 hours, and tan $\delta_0$ [%] is an initial value measured at an elapsed time of 0 hour, in a long-term durability test at 105° C. and under an applied voltage of 600 V.

[17] A biaxially stretched polypropylene film for capacitor having the elliptical shape density of 60/mm$^2$ or greater and 80/mm$^2$ or less on at least one of the surfaces of the polypropylene film, the polypropylene film having a change rate over time of tan $\delta$/tan $\delta_0$ of $5.0\times10^{-4}$ [1/hour] or less, wherein tan $\delta$/tan $\delta_0$ is a value of tan $\delta$ normalized by a value of tan $\delta_0$, tan $\delta$ [%] is a value measured at an elapsed time of between 0 hour and 500 hours, and tan $\delta_0$ [%] is an initial value measured at an elapsed time of 0 hour, in a long-term durability test at 105° C. and under an applied voltage of 600 V.

[18] A capacitor including a metallized film, wherein the metallized film includes a biaxially stretched polypropylene film for capacitor having a change rate over time of tan $\delta$/tan $\delta_0$ of $5.0\times10^{-4}$ [1/hour] or less and a metal coating on one or both surfaces of the polypropylene film, wherein tan $\delta$/tan $\delta_0$ is a value of tan $\delta$ normalized by a value of tan $\delta_0$, tan $\delta$ [%] is a value measured at an elapsed time of between 0 hour and 500 hours, and tan $\delta_0$ [%] is an initial value measured at an elapsed time of 0 hour, in a long-term durability test at 105° C. and under an applied voltage of 600 V.

Advantageous Effects of Invention

A capacitor including a biaxially stretched polypropylene film for capacitor of the present invention exhibits a small increase in tan $\delta$ even when a high voltage is applied at an elevated temperature for a long duration and the decrease in the electrostatic capacitance is small (suppressed) as a result. In addition, the polypropylene film of the present invention includes an internal structure that exhibits superior dielectric loss. Therefore, the present invention provides a biaxially stretched polypropylene film for capacitor having a long-term durability at a high voltage and at an elevated temperature.

BRIEF DESCRIPTION OF DRAWINGS

FIG. 2A is a (schematic) perspective view, FIG. 2B is a transverse sectional view, and FIG. 2C is a longitudinal sectional view along the line I-I' in FIG. 2B.

REFERENCE SIGNS LIST

Figure 1:
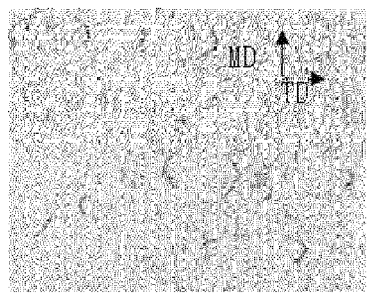
FIG. 1 is a result of observation by an optical microscope of the polypropylene film surface of the present invention. The polypropylene film is stretched while the direction indicated by the arrow MD is the direction of flow and the direction indicated by the arrow TD is the width direction.

20 Fine concavities and convexities
20a, 20b Convexities
20c Depression

DESCRIPTION OF EMBODIMENTS

In the present invention and present disclosure, the sign "/" means division (except for "/" used in "2θ/θ", "and/or" and "HLC-8121GPC/HT-type"). For example, "1/hour" means "1 divided by hour" and "tan $\delta$/tan $\delta_0$" means "tan $\delta$ divided by tan $\delta_0$".

1. Biaxially Stretched Polypropylene Film for Capacitor of the Present Invention A polypropylene film of the present invention is a biaxially stretched polypropylene film for capacitor having a change rate over time of tan $\delta$/tan $\delta_0$ of $5.0\times10^{-4}$ [1/hour] or less, wherein tan $\delta$/tan $\delta_0$ is a value of tan $\delta$ normalized by a value of tan $\delta_0$ (also referred to as "a change rate over time of tan $\delta$/tan $\delta_0$" hereinafter), wherein tan $\delta$ [%] is a value measured at an elapsed time of between 0 hour and 500 hours, and tan $\delta_0$ [%] is an initial value measured at an elapsed time of 0 hour, in a long-term durability test at 105° C. and under an applied voltage of 600 V.

If the change rate over time of tan $\delta$/tan $\delta_0$ is $5.0\times10^{-4}$ [1/hour] or less, a capacitor having a small change in the electrostatic capacitance $\Delta C$ even when a high voltage current is applied at an elevated temperature for a long duration can be obtained. In the present invention, tan $\delta$ [%] is a dielectric loss tangent (dielectric loss) measured when a AC voltage is applied to the capacitor using the polypropylene film of the present invention as a dielectric. Therefore, tan $\delta$ is the tan $\delta$ of the capacitor element, and the initial value tan $\delta_0$ is the initial value tan $\delta_0$ of the capacitor element. In other words, the polypropylene film of the present invention is a biaxially stretched polypropylene film for capacitor, wherein the capacitor, which is including the film of the present invention, having a change rate obtained by differentiating tan $\delta$/tan $\delta_0$ with respect to time, the rate is $5.0\times10^{-4}$ [1/hour] or less, wherein tan $\delta$/tan $\delta_0$ is a value of tan $\delta$ normalized by a value of tan $\delta_0$, tan $\delta$ [%] is a value of the capacitor measured at an elapsed time of between 0 hour and 500 hours, and tan $\delta_0$ [%] is an initial value of the capacitor measured at an elapsed time of 0 hour, in a long-term durability test of the capacitor, wherein the test is carried out with applied voltage of 600 V at 105° C. Also, the change in the electrostatic capacitance $\Delta C$ of the capacitor element is a proportion [%] of the difference obtained by subtracting the initial electrostatic capacitance from the electrostatic capacitance at a certain elapsed time, based on the initial electrostatic capacitance in the long-term durability test described above. If the change rate over time of tan $\delta$/tan $\delta_0$ exceeds $5.0\times10^{-4}$ [1/hour], the increase in the dielectric loss cannot be suppressed. As a result, a capacitor having a smaller change in the electrostatic capacitance $\Delta C$ when a high voltage current is applied for a long duration at an elevated temperature cannot be obtained. The long-term durability test above can be performed as follows. The initial electrostatic capacitance and tan $\delta_0$ are measured before the long-term durability test. Next, a DC voltage of 600 V is applied to the capacitor element in a thermostat chamber at 105° C. for 100 hours. Then, the capacitor element is removed from the thermostat chamber. The electrostatic capacitance and tan $\delta$ of the capacitor element after 100 hours are measured. Then, the capacitor element is placed in the thermostat chamber again. This procedure is repeated at a certain interval, e.g. every 100 hours or 500 hours. In the present invention, the electrostatic capacitance and tan $\delta$ of 5 capacitor elements measured at a certain interval are averaged. Examples of the thermostat chamber includes Convection-type constant temperature oven FC-610, manufactured by Advantec. Measurement of tan $\delta$ and electrostatic capacitance can be performed using LCR Hi-Tester 3522-50 manufactured by Hioki E.E. Corporation, for example. Convection-type constant temperature oven FC-610, manufactured by Advantec, was used as a thermostat chamber in the present invention. Measurement of tan $\delta$ and electrostatic capacitance was performed using LCR Hi-Tester 3522-50 manufactured by Hioki E.E. Corporation in the present invention. The change rate over time (the rate of change with respect to time) of tan $\delta$/tan $\delta_0$ is calculated as a slope of a linear regression line (trend line) obtained by the least-square method for a plot of tan $\delta$/tan $\delta_0$ measured in the long-term durability test against time. The change rate over time of tan $\delta$/tan $\delta_0$ can be expressed as $$\frac{d}{dt}\left(\frac{\tan\delta}{\tan\delta o}\right). \qquad [\text{Equation 1}]$$

For a capacitor using the polypropylene film of the present invention having the change rate over time of tan $\delta$/tan $\delta_0$ of the capacitor element of $5.0\times10^{-4}$ [1/hour] or less, the decrease in the electrostatic capacitance can be suppressed during the long-term use at a high voltage and an elevated temperature, resulting in improvement in long-term durability. The dielectric loss tan $\delta$ of a capacitor element is constituted of a dielectric loss originating from the motion of polypropylene molecules which constitute the dielectric body and an electrode loss such as an electrical resistance of the electrode and a leakage current between electrodes. Either of these losses continuously increases in an irreversible fashion, once it starts to increase. In the case of the increase in the dielectric loss originating from the motion of molecules, it is considered that the higher-order crystalline structure inside the polypropylene may be transformed due to generated heat inside the film capacitor and the like. Therefore, the process is typically irreversible and the dielectric loss continues to increase. In the case of the increase in the electrode loss as well, it is considered that the loss may increase due to the partial destruction or the structural change of the electrode part inside the film capacitor. Therefore, the electrode loss is considered to be irreversible, and may not be reversed back to decrease once it starts to increase. Thus, the present inventors considered that, during the use of the capacitor at a high voltage and an elevated temperature for a long duration, suppressing the increase in tan $\delta$ of the capacitor element as small as possible can lead to improvement in long-term durability, and completed the present invention. Even if the reason of superior effect discovered in the biaxially stretched polypropylene film of the present invention is different from the reasons given above, the biaxially stretched polypropylene film is still within the scope of the present invention.

The change rate over time of tan $\delta$/tan $\delta_0$ of the polypropylene film of the present invention is preferably $4.9\times10^{-4}$ or less, more preferably $4.8\times10^{-4}$ or less, even more preferably $4.7\times10^{-4}$ or less, particularly preferably $4.5\times10^{-4}$ or less and most preferably $4.0\times10^{-4}$ or less. Also, the change rate over time of tan $\delta$/tan $\delta_0$ is typically 0 or greater, and for example, $0.1\times10^{-8}$ or greater, $0.1\times10^{-5}$ or greater, $0.1\times10^{-4}$ or greater, or $1.0\times10^{-4}$ or greater, regarding the lower limit of the change rate. The change rate over time of tan $\delta$/tan $\delta_0$ of the polypropylene film of the present invention is preferably within any combined range of the upper limit and the lower limit described above, for example, 0 or greater and $5.0\times10^{-4}$ or less, $0.1\times10^{-8}$ or greater and $4.9\times10^{-4}$ or less, $0.1\times10^{-5}$ or greater and $4.8\times10^{-4}$ or less, $0.1\times10^{-4}$ or greater and $4.7\times10^{-4}$ or less, $1.0\times10^{-4}$ or greater and $4.0\times10^{-4}$ or less, or the like.

The change rate over time of tan $\delta$/tan $\delta_0$ in the present invention can be adjusted by (1) selection of raw materials (especially resin component), (2) the metal drum temperature for cooling and solidifying during the formation of the cast sheet, (3) the stretching temperature during cast sheet stretching, and the like.

As discussed above, the increase in the dielectric loss tan $\delta$ of the capacitor element can be significantly suppressed when both the dielectric loss originating from motion of molecules and the electrode loss of the capacitor element are suppressed. Appropriate selection of the raw material can suppress the dielectric loss of the capacitor element originating from the motion of molecules.

Also, adjusting the metal drum temperature for cooling and solidifying during the formation of the cast sheet and the stretching temperature during cast sheet stretching can achieve the desired elliptical shape density and total volume of convexities (total volume of convexities) having a height of 0.4 μm or greater on at least one of the surfaces of the sheet, resulting in the suppression of the dielectric loss of the capacitor element.

Figure 2A:
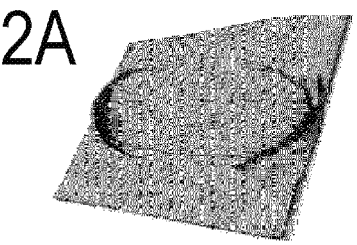
FIGS. 2A to 2C illustrate the fine crater-like concavities and convexities schematically.
Figure 2B:
Figure 2C:
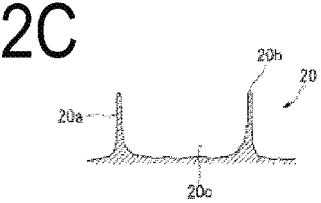

The biaxially stretched polypropylene film for capacitor of the present invention (may be referred to simply as a polypropylene film hereinafter) preferably has a rough surface with a fine crater-like concavities and convexities on at least one of the surfaces of the polypropylene film. When the polypropylene cast sheet having the β-type spherulite is stretched, the β-type spherulite undergoes crystalline transformation to the α-type spherulite, which has a larger density. As a result, the fine crater-like concavities and convexities are formed in the portion that underwent the crystalline transformation on the stretched film surface. Many of the fine crater-like concavities and convexities can be observed by a microscope, for example, as a pair of two circular arc shapes or substantially circular arc shapes (grouping the circular arc shapes and substantially circular arc shapes together, they may be referred to as "(substantially) circular arc shapes" hereinafter), where each arc shape of the pair is curved in an opposite direction to each other (refer to FIG. 1). Connecting the observed pair of two (substantially) circular arc shape portions by interpolation may form an elliptical shape or a substantially elliptical shape (grouping the elliptical shapes and substantially elliptical shapes together, they may be referred to as "(substantially) elliptical shapes" hereinafter). The pair of two (substantially) circular arc shape portions forms convexities and concavities between the convexities (refer to FIG. 2A). These convexities and concavities form a fine crater-like concavities and convexities described above (refer to FIGS. 2B and 2C). Note that two (substantially) circular arc shapes may be merged together to form a circular shape or a substantially circular shape (grouping the circular shape and substantially circular shape together, they may be referred to as "(substantially) circular shape" hereinafter) or (substantially) elliptical shape. The horizontal cross-section of the convexity in this case may be a ring shape or a substantially ring shape (grouping the ring shape and substantially ring shape together, they may be referred to as "(substantially) ring shape" hereinafter) or an elliptical ring shape or a substantially elliptical ring shape (grouping the elliptical ring shape and substantially elliptical ring shape together, they may be referred to as "(substantially) elliptical ring shape" hereinafter). Alternatively, a single (substantially) circular arc shape, without forming a pair, may be observed in some cases.

The polypropylene film of the present invention has fine crater-like concavities and convexities, where a total volume of convexities having a height of 0.4 μm or greater is preferably 50 μm³ or greater and 150 μm³ or less per 1 mm² on at least one of the surfaces of the polypropylene film. The total volume of convexities having a height of 0.4 μm or greater is more preferably 60 μm³ or greater and 140 μm³ or less, even more preferably 70 μm³ or greater and 130 μm³ or less and particularly preferably 80 μm³ or greater and 120 μm³ or less per 1 mm² on at least one of the surfaces of the polypropylene film of the present invention. If the polypropylene film of the present invention preferably has a total volume of convexities having a height of 0.4 μm or greater per 1 mm² of 50 μm³ or greater and 150 μm³ or less on at least one of the surfaces thereof, the electrode loss of the capacitor element can be reduced, and, as a result, a capacitor having a small change in the electrostatic capacitance ΔC can be easily obtained even when a high voltage current is applied to the capacitor at an elevated temperature for a long duration.

In the present invention, the total volume of convexities is the sum of volumes of the convexities which form the fine crater-like concavities and convexities in a certain region of the polypropylene film surface. The convexities that constitute the total volume of convexities include: convexities observed as a pair of (substantially) circular arc shapes where each arc shape of the pair is curved in an opposite direction to each other; convexities observed as (substantially) circular shapes or (substantially) elliptical shapes where two convexities are merged together; and convexities observed as a single (substantially) circular arc shape which does not form a pair. The total volume of convexities can be determined by a 3-dimensional surface roughness evaluation method using a light interferometric non-contact surface profiler. The gaps between the films can be evaluated 3-dimensionally by the 3-dimensional surface roughness evaluation method because the method evaluates the height of the whole area on the film surface. Thus, the method can recognize local small changes or variations on the measurement object surface, and can evaluate the surface roughness more precisely. The method can provide the 3-dimensional total volume of the convexities instead of simply providing the height of the convexities (2-dimensional surface roughness evaluation such as general center line average roughness Ra), to evaluate the gap between the films.

In the present invention, the total volume of convexities having a height of 0.4 μm or greater can be measured by "VertScan 2.0 (Model: R5500GML)" manufactured by Hishika Systems Co. Ltd., as a light interferometric non-contact surface profiler, for example. In the present invention, "VertScan 2.0 (Model: R5500GML)" manufactured by Hishika Systems Co. Ltd., was used as a light interferometric non-contact surface profiler. When "VertScan 2.0 (Model: R5500GML)" manufactured by Hishika Systems Co. Ltd., is used, 10 arbitrary points on the surface of the film to be observed are measured, each point being an area of 240 μm×180 μm of the field view. The measurement employs "WAVE Mode", using a 530 white filter and a ×20 objective lens. The obtained data undergoes the noise-removal process using a median filter. Thereafter, the data also undergoes the Gaussian filter process with the cutoff value of 30 μm. Then, the wavy component is removed. Thus, the rough surface of the film can be appropriately evaluated. In the plugin function "Bearing" in "VS-Viewer", the analysis software of the "VertScan 2.0", "Threshold Value for Positive Height" is set to 0.4 μm. Then, the value displayed as "Volume for Positive Height" is recorded as a total volume of convexities in one field view. The measurement is repeated for 10 different points, and the average of the measurements divided by the area of the field view, the total volume of convexities in one field view, is defined as the total volume of convexities having a height of 0.4 μm or greater per 1 mm² [unit: μm³/mm²].

The polypropylene film of the present invention preferably has an elliptical (oval) shape density of 60/mm² (60 pieces/mm²) or greater and 80/mm² or less on at least one of the surfaces thereof. The elliptical shape density is the number of (substantially) circular shapes and (substantially) elliptical shapes which are constituted of the pair of (substantially) circular arc shapes per unit area, observed on the surface of the polypropylene film by a digital microscope such as VHX-2000 digital microscope manufactured by Keyence Corp. If the elliptical shape density is 60/mm² or greater and 80/mm² or less, the capacitor having a small change in the electrostatic capacitance ΔC even when a high voltage is applied to the capacitor at an elevated temperature for a long duration can be favorably obtained.

Figure 3:
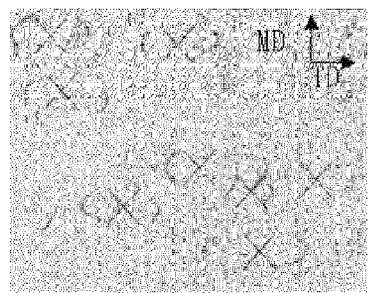
FIG. 3 is an example of counting the elliptical shapes on the surface of the polypropylene film in FIG. 1.

In the present invention, the elliptical shape density is the number of (substantially) circular shapes and (substantially) elliptical shapes, which are constituted of the merged convexities of the pair of (substantially) circular arc shapes, and (substantially) elliptical shapes, which is constituted of the pair of the (substantially) circular arc shape connected by interpolation, per unit area (the density of (substantially) circular shapes and (substantially) elliptical shapes which are formed from the pair of the (substantially) circular arc shape convexities). These shapes can be observed by a digital microscope and the like (e.g. VHX-2000 digital microscope manufactured by Keyence Corp.). The (substantially) elliptical shapes include: the (substantially) elliptical shape formed from the merged pair of the (substantially) circular arc shapes; and the (substantially) elliptical shape formed from the pair of the (substantially) circular arc shapes connected by interpolation in the range of 1 to 200 μm in length. The long axis of the (substantially) elliptical shape may be in the range of 1 to 250 μm and the short axis may be in the range of 1 to 150 μm. For example, the number of the (substantially) circular shapes and the (substantially) elliptical shapes is 8 in the case of FIG. 1 (refer to FIG. 3). When VHX-2000 digital microscope manufactured by Keyence Corp. is used for example, the measurement can be performed with lens power of 100×, under reflection mode measurement and the field view of 3.4 mm×2.6 mm. If the elliptical shape density is 60/mm² or greater and 80/mm² or less, the electrode loss of the capacitor element is reduced and, as a result, the capacitor having a small change in the electrostatic capacitance ΔC even when a high voltage is applied to the capacitor at an elevated temperature for a long duration can be favorably obtained.

The elliptical shape density is more preferably 65/mm² or greater and even more preferably 68/mm² or greater. The elliptical shape density is more preferably 80/mm² or less and even more preferably 78/mm² or less. In the polypropylene film of the present invention, the elliptical shape density is more preferably 65/mm² or greater and 80/mm² or less, and even more preferably 68/mm² or greater and 78/mm² or less.

In the present invention, the elliptical shape density is measured using VHX-2000 digital microscope manufactured by Keyence Corp. with lens power of 100×, under reflection mode measurement and the field view of 3.4 mm×2.6 mm.

The polypropylene film of the present invention preferably has Δ(tan δ) of −10.0 or greater and 0.50 or less. Δ(tan δ) is a difference obtained by subtracting a value of tan δ/tan $δ_0$ measured at an elapsed time of 1500 hour from a maximum of tan δ/tan $δ_0$ measured before an elapsed time of 1500 hours, where tan δ/tan $δ_0$ is a value of tan δ measured at an elapsed time of 0 hour to 1500 hours normalized by a value of initial value tan $\delta_0$ in the long-term durability test. If $\Delta(\tan \delta)$ is −10.0 or greater and 0.50 or less, the capacitor having a small change in the electrostatic capacitance $\Delta C$ even when a high voltage is applied to the capacitor at an elevated temperature for a long duration can be easily obtained.

The polypropylene film of the present invention has the $\Delta(\tan \delta)$ of 0.45 or less more preferably, even more preferably 0.40 or less, and more preferably 0.35 or less, regarding an upper limit of the $\Delta(\tan \delta)$. The polypropylene film of the present invention has the $\Delta(\tan \delta)$ of −5.0 or greater more preferably, even more preferably −3.0 or greater, and more preferably −1.5 or greater, regarding a lower limit of the $\Delta(\tan \delta)$. The polypropylene film of the present invention has the value of $\Delta(\tan \delta)$ in the range of the upper limit and the lower limit combined, such as −5.0 or greater and 0.45 or less, −3.0 or greater and −0.40 or less, or −1.5 or greater and 0.35 or less.

For the polypropylene film of the present invention, the maximum convexity height (Sp) is preferably 0.5 μm or greater and 1.0 μm or less, more preferably 0.5 μm or greater and 0.9 μm or less, even more preferably 0.6 μm or greater and 0.9 μm or less, particularly preferably 0.6 μm or greater and 0.8 μm or less, and most preferably 0.7 μm or greater and 0.8 μm or less on at least one of the surfaces thereof. In the present invention, the maximum convexity height is the maximum height of the convexities which form the fine crater-like concavities and convexities in a certain region of the polypropylene surface.

In the present invention, the maximum convexity height (Sp) can be measured by the light interferometric non-contact surface profiler, for example. "VertScan 2.0 (Model: R5500GML)" manufactured by Hishika Systems Co. Ltd., may be used as the light interferometric non-contact surface profiler, for example. In the present invention, "VertScan 2.0 (Model: R5500GML)" manufactured by Hishika Systems Co. Ltd., was used as the light interferometric non-contact surface profiler. When "VertScan 2.0 (Model: R5500GML)" manufactured by Hishika Systems Co. Ltd., is used, 10 arbitrary points on the surface of the film to be observed are measured, each point being an area of 240 μm×180 μm of the field view. The measurement employs "WAVE Mode", using a 530 white filter and a ×20 objective lens. The obtained data undergoes the noise-removal process using a median filter. Thereafter, the data also undergoes the Gaussian filter process with the cutoff value of 30 μm. Then, the wavy component is removed. Thus, the rough surface of the film can be appropriately evaluated. Then, various 3-dimensional roughness parameters including the maximum convexity height (Sp) can be determined. In the present invention, the average value is calculated from the measurements at 10 points.

The polypropylene film of the present invention has a crystallite size of 122 Å or less where the crystallite size is determined from the half width of the reflection peak from (040) plane (face) of α-crystal measured by wide angle X-ray diffractometry, using the Scherrer's equation. Also, the polypropylene film preferably has a value of birefringence relative to the thickness direction, $\Delta Nyz$, of $7.0 \times 10^{-3}$ or greater and $10.0 \times 10^{-3}$ or less, where the value of birefringence is determined by the optical birefringence measurement.

In the present invention, "crystallite size" is the crystallite size calculated from an α-crystal (040) plane reflection peak of the polypropylene film measured by the wide angle X-ray diffraction method (XRD method) using the Scherrer's equation described below. The crystallite size of the polypropylene film of the present invention is preferably 122 Å or less and more preferably 120 Å or less. The crystallite size is preferably 100 Å or greater, more preferably 110 Å or greater, and particularly preferably 115 Å or greater. Thus, the crystallite size is more preferably 110 Å or greater and 120 Å or less, and particularly preferably 115 Å or greater and 120 Å or less. In the polypropylene film having a smaller crystallite size, heat resistance, voltage resistance, and long-term heat resistance and voltage resistance can be preferably improved because leakage current is smaller and occurrence of structural disorder due to Joule heating is suppressed. Note that the lower limit of the crystallite size is typically considered to be approximately 100 Å, taking mechanical strength or the like and the thickness of lamella (folded crystal) of polymer chains into consideration.

Specifically, the "crystallite size" of the polypropylene film of the present invention can be determined as described below. First, the wide angle X-ray diffraction measurement is carried out on the biaxially stretched polypropylene film and the metallized film thereof to determine the half width of the obtained α-crystal (040) plane reflection peak. The crystallite size is determined by the Scherrer's equation:

$$D = K \times \lambda / (\beta \times \cos \theta) \quad (1)$$

where D is the crystallite size (Å), K is a constant (shape factor), λ is the used X-ray wavelength (Å), β is the half width of the α-crystal (040) plane reflection peak, and θ is the diffraction Bragg angle of (040) face of α-crystal.

In the present invention, to measure the α-crystal (040) plane reflection peak, for example, a Benchtop X-ray diffraction instrument, MiniFlex 300 (trade name), manufactured by Rigaku Corporation can be used. In the present invention, to measure the α-crystal (040) plane reflection peak, a Benchtop X-ray diffraction instrument, MiniFlex 300 (trade name), manufactured by Rigaku Corporation was used. Using X-ray generated at power of 30 kV and 10 mA, the CuKα radiation that is monochromatized by a graphite monochromator (wavelength: 1.5418 Å) is parallelized by a slit and a film to be measured was irradiated. The diffraction intensity is measured by coupled 2θ/θ scan using a goniometer by using a scintillation counter. The half width of the α-crystal (040) plane reflection peak is determined from the obtained data using the integrated X-ray powder diffraction software PDXL provided in the instrument.

The crystallite size can be determined from the value of θ and the half width of the diffraction reflection peak obtained in the measurement described above using the Scherrer's equation (1). In the present invention, the shape factor K of 0.94, and λ of 1.5418 Å are used, for example.

In general, the crystallite size can be controlled by the conditions such as cooling condition and stretching condition during the formation of the cast sheet. The lower temperature of the group of the metal drums during the formation of the cast sheet tends to reduce the crystallite size and the higher ratio of stretching also tends to reduce the crystallite size. The group of the metal drums above is a collection of metal drums constituting two or more metal drums for cooling the cast sheet. Therefore, the temperature of the group of the metal drums refers to the temperature of all the metal drums constituting the group of the metal drums.

In the present invention, the birefringence value $\Delta Nyz$ relative to the thickness direction of the polypropylene film refers to the birefringence value $\Delta Nyz$ relative to the thickness direction determined by the optical birefringence measurement. Specifically, the birefringence value $\Delta Nyz$ is the value obtained by subtracting 3 dimensional refractive index in z-axis direction from the 3-dimensional refractive index in y-axis direction, where x-axis and y-axis are the main axes in the plane of the film, z-axis is the thickness direction of the film (perpendicular direction relative to the plane of the film), and x-axis is the slow axis in the direction of the higher refractive index of the two directions in the plane of the film. As an index for the degree of orientation of the film, the birefringence value $\Delta Nyz$ can be used. When the degree of the orientation is large, the 3-dimensional refractive index for y-axis is larger and the 3-dimensional refractive index for z-axis is smaller. Therefore, the birefringence value $\Delta Nyz$ is larger, The birefringence value $\Delta Nyz$ of the biaxially stretched polypropylene film for capacitor of the present invention relative to the thickness direction is preferably $7.0 \times 10^{-3}$ or greater and $10.0 \times 10^{-3}$ or less. The birefringence value is more preferably $7.0 \times 10^{-3}$ or greater and $9.0 \times 10^{-3}$ or less and even more preferably $7.5 \times 10^{-3}$ or greater and $9.0 \times 10^{-3}$ or less. When the birefringence value $\Delta Nyz$ is $7.0 \times 10^{-3}$ or greater, the orientation of the film is sufficient, and voltage resistance and voltage resistance over a long duration are also sufficient. On the other hand, if the birefringence value $\Delta Nyz$ is $10.0 \times 10^{-3}$ or less, the film is easily obtained compared to the highly-oriented film having the birefringence value $\Delta Nyz$ greater than $10.0 \times 10^{-3}$ from the perspective of film formability.

In the present invention, RE-100, the retardation measurement instrument manufactured by Otsuka Electronics Co., Ltd. can be used to measure the "birefringence value $\Delta Nyz$" of the polypropylene film relative to the thickness direction. In the present invention, RE-100, the retardation measurement instrument manufactured by Otsuka Electronics Co., Ltd. was used. The measurement of the retardation is performed by the slope method. Specifically, x-axis and y-axis are the main axes in the plane of the film, z-axis is the thickness direction of the film (perpendicular direction relative to the plane of the film), and x-axis is the slow axis in the direction of the higher refractive index of the two directions in the plane of the film. Each retardation value is measured at every 10° in the range of 0° to 50° of the x-axis, which is the sloped axis, relative to the z-axis. The birefringence value $\Delta Nyz$ in y-axis relative to the thickness direction (z-axis direction) is calculated from the retardation value obtained according to the method described in the non-Patent Document "Introduction to Polarized Microscopy of Polymer Material", p. 105-120 (2001) by Yutaka Awaya. Note that, in the successive stretching, TD is the slow axis (x-axis) and MD is y-axis when the stretching ratio in TD (width direction) is larger than the stretching ratio in MD (direction of flow). for example.

When orienting the polypropylene film in the plane direction, the refractive index Nz in the thickness direction changes and the birefringence $\Delta Nyz$ increases, resulting in the improvement in the voltage resistance (increase in the dielectric breakdown voltage). This may be explained as following. When the polypropylene molecular chains are oriented in the plane direction, the refractive index Nz in the thickness direction decreases. The electrical conductance in the film thickness direction decreases because it occurs via transport between the molecular chains. Consequently, the voltage resistance improves in the case that the polypropylene molecular chains are oriented in the plane direction (the birefringence $\Delta Nyz$ is large) compared to the case that the polypropylene molecular chains are not oriented in the plane direction (the birefringence $\Delta Nyz$ is small), that is, the case that the electrical conductance occurs via transport within the molecular chains.

In general, "the birefringence value $\Delta Nyz$" can be controlled by changing the orientation of the polypropylene molecular chains, which can be changed by film formation conditions such as (higher stretching ratio and the like). Also, "the birefringence value $\Delta Nyz$" can be controlled by changing the characteristics of the polypropylene resin.

The polypropylene film of the present invention is a polypropylene film formed by biaxially stretching the polypropylene resin composition including the polypropylene resin. The polypropylene resin is not particularly limited, and the polypropylene resin that forms a β-type spherulite when made into the cast sheet. The polypropylene resin may include one type or two or more types of polypropylene resins.

The polypropylene resin A is preferable as the polypropylene resin. The polypropylene resin A preferably has the weight average molecular weight of 250000 or greater and 450000 or less, and more preferably 250000 or greater and 400000 or less. The resin flowability is suitable and control of the thickness of the cast sheet is easy, a thin stretched film may be produced easily, because the polypropylene resin A has the weight average molecular weight of 250000 or greater and 450000 or less. Furthermore, unevenness in the thickness of the sheet and film is less likely to occur and sheet may have suitable stretchability, thus it is preferable.

The polypropylene resin A preferably has a molecular weight distribution (weight average molecular weight/number average molecular weight (Mw/Mn)) of 7.0 or greater and 12.0 or less, more preferably (Mw/Mn) of 7.5 or greater and 12.0 or less, even more preferably (Mw/Mn) of 7.5 or greater and 11.0 or less, particularly preferably (Mw/Mn) of 8.0 or greater and 11.0 or less, and most preferably (Mw/Mn) of 9.0 or greater and 11.0 or less. Furthermore, the polypropylene resin A preferably has the molecular weight distribution (Z average molecular weight/number average molecular weight (Mz/Mn)) of 20.0 or greater and 70.0 or less, more preferably the molecular weight distribution (Mz/Mn) of 25.0 or greater and 60.0 or less, and even more preferably the molecular weight distribution (Mz/Mn) of 25.0 or greater and 50.0 or less, The polypropylene resin A having each molecular weight distribution in the preferable range above can easily achieve the desired change rate over time of $\tan \delta / \tan \delta_0$ for the film of the present invention.

The content of the polypropylene resin A is preferably 55 wt. % or greater, and the content is preferably 90 wt. % or less, per 100 wt. % of the total of the polypropylene resin. The content of the polypropylene resin A is more preferably 60 wt. % or greater, and the content is more preferably 85 wt. % or less, per 100 wt. % of the total of the polypropylene resin. The content of the polypropylene resin A is particularly preferably 60 wt. % or greater, and the content is particularly preferably 80 wt. % or less, per 100 wt. % of the total of the polypropylene resin.

In the present invention, the weight average molecular weight (Mw), the number average molecular weight (Mn), and z average molecular weight and weight molecular weight distribution (Mw/Mn and Mz/Mn) of the polypropylene resin can be measured by a gel-permeation chromatograph (GPC) instrument, such as the high-temperature GPC with built-in differential refractometer (RI), HLC-8121GPC-HT, manufactured by Tosoh Corporation. As GPC columns, three coupled TSKgel GMHHR-H(20)HT columns, manufactured by Tosoh Corporation, can be used. In the present invention, the high-temperature GPC with built-in differential refractometer (RI), model HLC-8121GPC-HT, manufactured by Tosoh Corporation was used. As GPC columns, three coupled TSKgel GMHHR-H(20)HT columns, manufactured by Tosoh Corporation, were used. The measurement can be performed as follows. Measurement of Mw and Mn can be performed at the column temperature of 140° C. by passing trichlorobenzene as an eluent through the columns at a flow rate of 1.0 mL/10 min. The calibration curve of the molecular weight M is created using the polystyrene standard manufactured by Tosoh Corporation, and the measurements are calibrated using the polystyrene standard. Thus, Mw, Mn and Mz are obtained. Furthermore, the logarithm of the polystyrene standard with base of 10 is referred to as logarithm molecular weight (Log(M)).

The difference obtained by subtracting the differential distribution value at the logarithm molecular weight Log(M) of 6.0 from the differential distribution value at the logarithm molecular weight Log (M) of 4.5 in the differential molecular weight distribution curve of the polypropylene resin A above (may be referred to as the difference of the differential distribution values) is 8.0% or greater and 18.0% or less, preferably 10.0% or greater and 17.0% or less and even more preferably 12.0% or greater and 16.0% or less, based on the differential distribution value at Log(M) of 6.0 as 100% (reference).

The component at the logarithm molecular weight Log (M) of 4.5 is taken as the representative distribution value of the molecular weight component having the molecular weight of 10000 to 100000 (may be referred to simply as "low molecular weight component" hereinafter), in the lower molecular weight side relative to the value of Mw (250000 to 450000) of the polypropylene resin A. This component is compared with the component at the vicinity of Log(M) of 6.0, which is taken as the representative distribution value of the molecular weight component having the molecular weight of approximately 1000000 (may be referred to simply as "high molecular weight component" hereinafter), and the low molecular weight component exists more than the high molecular weight component by the proportion (ratio) of 8.0% or greater and 18.0% or less. That is, the molecular weight distribution Mw/Mn being 7.0 to 12.0 only indicates the width of the molecular weight distribution, and the quantitative relationship between the high molecular weight component and the low molecular weight component is not clear. Thus, the polypropylene resin A of the present invention preferably has a large molecular weight distribution, and at the same time, the component having the molecular weight of 10000 to 100000 is preferably present more than the component having the molecular weight of 1000000 by the proportion 8.0% or greater and 18.0% or less.

The polypropylene resin A has a difference obtained by subtracting the differential distribution value at the Log(M) of 6.0 from the differential distribution value at the Log(M) of 4.5 is 8.0% or greater and 18.0% or less based on the differential distribution value at the Log(M) of 6.0 as 100% (reference). Thus, the low molecular component is present more than the high molecular component by the proportion of 8.0% or greater and 18.0% or less, and the crystallite size decreases and the surface with the desired orientation and roughness can be obtained easily. Thus, it is preferable.

Such a differential distribution value can be obtained as follows. The intensity curve against time (generally called "elution curve), which can be obtained from the differential refractometer (RI) of the GPC, is used. The elution curve was transformed to the intensity curve against Log(M) by transforming the time axis to the logarithm molecular weight (Log(M)) using the calibration curve obtained using the polystyrene standard. The RI detect intensity is proportional to the component concentration. If the total area of the intensity curve is taken as 100%, the integrated distribution curve against the logarithm molecular weight Log(M) can be obtained. The differential distribution curve can be obtained by differentiating the integrated distribution curve by Log (M). Therefore, the "differential distribution" means the differential distribution of the concentration fraction relative to the molecular weight. From this curve, the differential distribution value at a certain Log(M) can be read.

The polypropylene resin A preferably has the mesopentad fraction [mmmm] of 94.0% or greater and 99.5% or less, more preferably 94.0% or greater and 99.0% or less, even more preferably 94.0% or greater and 98.5% or less, particularly preferably 94.0% or greater and less than 98.0%, and most preferably 95.0% or greater and 97.0% or less. The mesopentad fraction is preferably 94.0% or greater, more preferably 94.5% or greater and even more preferably 95% or greater, regarding the lower limit of the mesopentad fraction.

The mesopentad fraction [mmmm] in the preferable range above can easily achieve the desired change rate over time of tan $\delta$/tan $\delta_0$ for the film of the present invention, due to the appropriate increase in the crystallinity of the resin caused by the appropriately high stereoregularity. Therefore, the initial voltage resistance and the long-term voltage resistance tend to improve appropriately. On the other hand, the rate of the solidification (crystallization) during the cast sheet formation is appropriate and appropriate stretchability can be achieved.

Mesopentad fraction ([mmmm]) is an indicator of stereoregularity that can be obtained by high temperature nuclear magnetic resonance (NMR) analysis. For example, the mesopentad fraction ([mmmm]) can be measured by using JNM-ECP500, high temperature Fourier transform nuclear magnetic resonance (high temperature FT-NMR), manufactured by JEOL Ltd. The observed nucleus is $^{13}C$ (125 MHz), the measuring temperature is 135° C., and a mixed solvent of o-dichlorobenzene (ODCB) and deuterated ODCB (mixing proportion=4:1) can be used for the solvent. High temperature NMR analysis can be carried out by, for example, the method described in "Polymer Analysis Handbook, New Edition, Japan Society for Analytical Chemistry-Research Committee of Polymer Analysis (ed.), Kinokuniya Co., Ltd., 1995, pp. 610". In the present invention, high temperature NMR analysis was carried out by using JNM-ECP500, high temperature Fourier transform nuclear magnetic resonance (high temperature FT-NMR), manufactured by JEOL Ltd. according to the method described in "Polymer Analysis Handbook, New Edition, Japan Society for Analytical Chemistry-Research Committee of Polymer Analysis (ed.), Kinokuniya Co., Ltd., 1995, pp. 610".

Single-pulse proton broad-band decoupling can be used for the measurement mode, the pulse width is 9.1 μsec (45° pulse), the pulse interval is 5.5 sec, the cumulative number of measurements is 4500, and the chemical shift standard is $CH_3$ (mmmm) at 21.7 ppm.

Pentad fraction, which represents stereoregularity, is calculated as a percentage from the integrated intensity of each signal derived from a combination (such as mmmm, or mrrm) of pentads consisting of pentads arranged in the same direction (mesopentads (m)) and pentads arranged in different directions (racemopentads (r)). For example, the description in "T. Hayashi, et al., Polymer, Vol. 29, pp. 138 (1988)" or the like can be referred to regarding assignment of each signal derived from mmmm, mrrm, and the like.

The polypropylene resin composition can include polypropylene resin B as well as polypropylene resin A. The polypropylene resin B preferably has Mw of 300000 or greater and 400000 or less, Mw/Mn of 7.0 or greater and 9.0 or less, and the difference obtained by subtracting the differential distribution value at Log(M) of 6.0 from the differential distribution value at Log(M) of 4.5 in the differential molecular weight distribution curve of 1.0% or greater and less than 8.0%.

The polypropylene resin B preferably has Mw of 300000 or greater and 400000 or less, and more preferably 330000 or greater and 380000 or less.

The polypropylene resin B preferably has the molecular weight distribution (Mw/Mn) of 7.0 or greater and 9.0 or less, more preferably 7.5 or greater and 8.9 or less and even more preferably 7.5 or greater and 8.5 or less. The polypropylene resin B having the molecular weight distribution in the preferable range above can easily achieve the desired change rate over time of tan $\delta$/tan $\delta_0$ for the film of the present invention.

The difference obtained by subtracting the differential distribution value at the logarithm molecular weight Log(M) of 6 from the differential distribution value at the logarithm molecular weight Log (M) of 4.5 in the differential molecular weight distribution curve of the polypropylene resin B is 1.0% or greater and less than 8.0%, preferably 3.0% or greater and 7.5% or less, and even more preferably 5.0% or greater and 7.5% or less, based on the differential distribution value at Log(M) of 6 as 100% (reference).

The polypropylene resin B preferably has the molecular weight distribution (Z average molecular weight/number average molecular weight (Mz/Mn)) of 20.0 or greater and 70.0 or less, more preferably the molecular weight distribution (Mz/Mn) of 25.0 or greater and 60.0 or less, and particularly preferably the molecular weight distribution (Mz/Mn) of 25.0 or greater and 50.0 or less. The mesopentad fraction ([mmmm]) of the polypropylene resin B is preferably 94.0% or greater and less than 98.0%, and even more preferably 95.0% or greater and 97.0% or less. The mesopentad fraction is preferably 94.0% or greater, more preferably 94.5% or greater, and even more preferably 95% or greater, regarding the lower limit of the mesopentad fraction.

When the polypropylene resin B is used as polypropylene resin, the content of the polypropylene resin B is preferably 10 wt. % or greater and 45 wt. % or less, more preferably 15 wt. % or greater and 40 wt. % or less, and particularly preferably 20 wt. % or greater and 40 wt. % or less, per 100 wt. % of the total of the polypropylene resin.

When the polypropylene resin include the polypropylene resin A and B (i.e. the polypropylene resin A and polypropylene resin B are used as the polypropylene resin included in the polypropylene film of the present invention), the polypropylene resin preferably include 55 to 90 wt. % of the polypropylene resin A and 45 to 10 wt. % of the polypropylene resin B, more preferably 60 to 85 wt. % of the polypropylene resin A and 40 to 15 wt. % of the polypropylene resin B, and particularly preferably 60 to 80 wt. % of the polypropylene resin A and 40 to 20 wt. % of the polypropylene resin B, per 100 wt. % of the total of the polypropylene resin.

When the polypropylene resin includes the polypropylene resin A and the polypropylene resin B, the polypropylene film obtained by mixing and forming the polypropylene resin A and B having the different difference of the differential distribution values (preferably the weight average molecular weight and/or Mw/Mn), that is, having the different configurations of the molecular weight distributions, is preferably due to the reduction in the crystallite size, because the film is in the certain type of fine mixture (phase separation) state caused by the appropriate difference in quantitative relationship between the high molecular weight component and low molecular weight component. Furthermore, it is preferable that such a polypropylene film may be easily highly oriented even at the same stretching ratio, without increasing the stretching ratio, and the fine roughness can be obtained on the surface easily. If the polypropylene resin includes both polypropylene resin A and polypropylene resin B, the present invention may present the superior effect due to the reasons described above, but the present invention is not limited in any way.

The polypropylene resin used in the present invention preferably includes both polypropylene resin A and polypropylene resin B, because a capacitor having the small change in the electrostatic capacitance $\Delta C$ even when a high voltage current is applied at an elevated temperature for a long duration can be easily obtained. Also, in the case of the polypropylene resin above, the crystallite size and the birefringence value $\Delta Nyz$ described above can be easily achieved. Thus, it is preferable.

The polypropylene resin composition used in the present invention and the polypropylene film of the present invention can include a polypropylene resin besides the polypropylene resin A and B (may be referred to as "the other polypropylene resin" hereinafter). "The other polypropylene resin" is a resin which is designated as polypropylene resin generally, and is not particularly limited as long as the biaxially stretched polypropylene film for capacitor, the object of the present invention, can be obtained. As the other polypropylene resin, a long-chain branched polypropylene (branched-type polypropylene) can be included to improve heat resistance as an objective, for example. The polypropylene resin according to the present invention can include the other polypropylene resin above in an amount that does not bring an adverse effect on the biaxially stretched polypropylene film for capacitor of the object of the present invention.

The polypropylene resin composition used in the present invention and the polypropylene film of the present invention can further include a resin besides the polypropylene resin (may be referred to as "the other resin" hereinafter). "The other resin" is a resin, which is different from the polypropylene resin used as the main component resin generally, and is not particularly limited as long as the biaxially stretched polypropylene film for capacitor, the object of the present invention, can be obtained. Examples of the other resin include other polyolefins except polypropylene, such as polyethylene, poly(1-butene), polyisobutene, poly(1-pentene), and poly(1-methylpentene); copolymers of $\alpha$-olefins, such as ethylene-propylene copolymers, propylene-butene copolymers, and ethylene-butene copolymers; vinyl monomer-diene monomer random copolymers, such as styrene-butadiene random copolymers; vinyl monomer-diene monomer-vinyl monomer random copolymers, such as styrene-butadiene-styrene block copolymers; and the like. The polypropylene resin composition used in the present invention can include the other resin above in an amount that does not bring an adverse effect on the biaxially stretched polypropylene film for capacitor of the object of the present invention. The polypropylene resin composition may preferably include the other resin at 10 parts by weight or less, and more preferably at 5 parts by weight or less, per 100 parts by weight of the polypropylene resin. The polypropylene resin composition may preferably include the other resin at 0.1 parts by weight or greater, and more preferably at 1 parts by weight or greater, per 100 parts by weight of the polypropylene resin.

The polypropylene resin used in the present invention can be produced using the polymerization method conventionally known in general and is not particularly limited as long as the polypropylene resin can be produced. Examples of such polymerization methods include vapor phase polymerization, bulk polymerization and slurry polymerization.

The polymerization may be single-stage polymerization using one polymerization reactor, or may be multi-stage polymerization using at least two or more polymerization reactors. Furthermore, polymerization may be performed by adding hydrogen or a comonomer as a molecular weight modifier in a reactor.

Generally, the conventionally known Ziegler-Natta catalyst can be used as a catalyst, and the catalyst is not particularly limited as long as the polypropylene resin according to the present invention can be obtained. The catalyst can include a co-catalyst component or a donor as well. Adjusting the catalyst or polymerization conditions can control the molecular weight, molecular weight distribution and stereoregularity.

"The difference of the differential distribution values" can be controlled to a desired value by various methods such as controlling the polymerization conditions, controlling the molecular weight distribution, using a decomposing agent, performing a decomposition process on the higher molecular weight component selectively, and mixing the resin having the different molecular weight.

When the configuration of the molecular weight distribution is adjusted by the polymerization condition, a polymerization catalyst to be described later may be preferably used to adjust the configuration of the molecular weight distribution and molecular weight easily. In this case, it is preferable that the catalyst can be freely included. Examples of the method using the multi-stage polymerization reaction can include the methods described below.

The polymerization reaction is performed at an elevated temperature with a plurality of reactors of a polymerization reactor for a high molecular weight component and a reactor for a low molecular weight or medium molecular weight component in the presence of a catalyst. The high molecular weight component and the low molecular weight component of the produced resin are prepared regardless of the order in the reactors. First, propylene and the catalyst are introduced into the first polymerization reactor in the first polymerization step. With these components, hydrogen as a molecular weight adjusting agent, in an amount necessary to reach the required molecular weight of the polymer, is mixed. For example, in the case of slurry polymerization, the reaction temperature is approximately from 70 to 100° C. and the retention time is approximately from 20 minutes to 100 minutes. A plurality of the reactors can be used in series, for example. In this case, the polymerization product of the first step is continuously transported to the next reactor together with an additional propylene, the catalyst and the molecular weight adjusting agent. Subsequently, the second polymerization is performed, in which the molecular weight is adjusted to either lower molecular weight or higher molecular weight than the molecular weight adjusted in the first polymerization step. By adjusting the yields (amounts of productions) from the first and second reactors, the composition (constitution) of the high molecular weight component and low molecular weight component can be adjusted.

As the catalyst, a typical Ziegler-Natta catalyst is preferably used. Also, the co-catalyst component and the donor may be included. By suitably adjusting the catalyst or polymerization conditions, the molecular weight distribution can be controlled.

When the configuration of the molecular weight distribution of the polypropylene raw material resin is adjusted by peroxidative degradation, it is preferable to employ a method in which peroxidative treatment is performed with decomposing agents, such as hydrogen peroxide and organic peroxide. When a peroxide is added to a decomposable polymer such as polypropylene, a hydrogen extraction reaction from the polymer can occur. It is known that, although a portion of the resulting polymer radical bonds again and undergoes crosslinking reaction, nearly all of the radicals undergo secondary decomposition (β-cleavage) to be divided into two polymers having smaller molecular weights. Thus, there is a high probability that decomposition proceeds starting with the high molecular weight component, and accordingly, the low molecular weight component increases and the configuration of molecular weight distribution can be adjusted. An example of a method used to obtain a resin containing a suitable amount of a low molecular weight component by peroxidative decomposition is described below.

To a polymer powder or pellets of a polypropylene resin obtained by polymerization reaction, an organic peroxide in the form of, for example, 1,3-bis(tert-butylperoxide isopropyl)benzene at approximately 0.001 mass % to 0.5 mass % is adjusted and added while considering the target composition (constitution) of the high molecular weight component and the low molecular weight component. These are melted and kneaded with a melt kneader at a temperature of approximately 180° C. to 300° C.

If the content of the low molecular weight component is adjusted by blending (resin mixing), it is preferable that at least two or more types of resins, having different molecular weights be mixed in a dry state or a melted state.

In general, a polypropylene mixture system including two or more types of resins, in which the main resin and additional resin of the higher average molecular weight or lower average molecular weight than the main resin at about 1 to 40 mass % are mixed, is preferably used because the low molecular weight component is easily adjusted.

Furthermore, in the case of the adjustment by mixing, as the reference of the average molecular weight, melt flow rate (MFR) can also be used. In this case, it is preferable that the difference of MFR between the main resin and the additional resin be from 1 to 30 g/10 min, from the perspective of convenience during the preparation.

The method of mixing the plurality of the polypropylene resins (e.g. the polypropylene resin A as a main component and the polypropylene resin B as a sub component (additional component)), i.e. the method of preparing the polypropylene resin composition, is not particularly limited. Examples of such methods include the method in which the polymer powder or pellet of the polypropylene resin is dry-blended using a mixer and the like, and the method in which the polymer powders or pellets of the main component polypropylene resin A and additional polypropylene resin B are fed to a kneader and melted and kneaded to produce the blend resin (i.e. the melt-blend method), but any method can be employed. Alternatively, the polymer powder or pellet of each polypropylene resin can be fed to an extruder directly and kneaded inside the extruder to produce the polypropylene resin composition in which polypropylene resins are mixed.

The mixer and the kneader are not particularly limited. The kneader may be a single-screw type, a twin-screw type or multi-screw type having more than two screws. In the case of twin or multi-screw type, any type of kneading with rotation in the same direction or in the opposite direction can be used.

In the case of blending by melt-kneading, the kneading temperature is not particularly limited as long as suitable kneading can be performed; however, typically, the temperature is in a range of 200° C. to 300° C., and preferably 230° C. to 270° C. The excessively high temperature is not preferable because it may lead to degradation of the resin. To inhibit the degradation during kneading and mixing of the resin, the kneader may be purged with an inert gas, such as nitrogen. Mixed polypropylene raw material resin pellets can be obtained by pelletizing the melt-kneaded resin into an appropriate size using a generally conventionally known pelletizer.

The total ash content caused by the polymerization catalyst residues or the like included in the polypropylene raw material resin in the present aspect is preferably as low as possible to enhance electrical properties. The total ash content is preferably 100 ppm or less, more preferably 50 ppm or less, even more preferably 40 ppm or less, and particularly preferably 30 ppm or less, based on the amount of the polypropylene resin (100 parts by weight). The total ash content is preferably as small as possible, and the lower limit is not particularly limited, but is preferably 0 ppm or greater, 0.01 ppm or greater, 0.1 ppm or greater, for example.

The polypropylene resin composition may further include an additive. "An additive" is an additive which is used in polypropylene resin compositions generally, and is not particularly limited as long as the biaxially stretched polypropylene film for capacitor, the object of the present invention, can be obtained. Examples of such an additive include antioxidants, necessary stabilizers, such as a chlorine absorber and an ultraviolet absorber, lubricants, plasticizers, flame retardants, antistatic agents, and the like. The polypropylene resin composition used in the present invention can include the additive above in an amount that does not bring an adverse effect on the biaxially stretched polypropylene film for capacitor of the object of the present invention.

"An antioxidant" is generally called an antioxidant, and is used in polypropylene generally, and is not particularly limited as long as the biaxially stretched polypropylene film for capacitor, the object of the present invention, can be obtained. The antioxidant is typically used for two types of purposes. One of the purposes is to inhibit thermal degradation and oxidative degradation inside an extruder. The other purpose is to inhibit deterioration and contribute to enhancement of capacitor performance during long-term use as a capacitor film. The antioxidant that inhibits thermal degradation and oxidative degradation inside an extruder is referred to as "primary agent", and the antioxidant that contributes to enhancement of capacitor performance is referred to as "secondary agent".

Two types of antioxidants may be used for these two purposes, or one type of antioxidant may be used for the two purposes.

When two types of antioxidants are used, the polypropylene resin composition may contain, for example, as a primary agent, approximately from 100 ppm to 10000 ppm (more preferably, 1000 ppm to 4000 ppm) of 2,6-di-tert-butyl-para-cresol (generic name: BHT) based on the amount of the polypropylene resin (100 parts by weight). The antioxidant for this purpose is mostly consumed during the formation step in an extruder and hardly remains in the film after the film formation (typically present at a residual amount of less than 100 ppm).

As the secondary agent, a hindered phenol-based antioxidant having a carbonyl group can be used.

"A hindered phenol-based antioxidant having a carbonyl group" is a hindered phenol-based antioxidant having a carbonyl group in general, and is not particularly limited as long as the biaxially stretched polypropylene film for capacitor, the object of the present invention, can be obtained.

Examples of the hindered phenol-based antioxidant having a carbonyl group include triethylene glycol-bis[3-(3-tert-butyl-5-methyl-4-hydroxyphenyl)propionate] (trade name: Irganox 245), 1,6-hexanediol-bis[3-(3,5-di-tert-butyl-4-hydroxyphenyl)propionate] (trade name: Irganox 259), pentaerythrityl-tetrakis[3-(3,5-di-tert-butyl-4-hydroxyphenyl) propionate] (trade name: Irganox 1010), 2,2-thio-diethylenebis[3-(3,5-di-tert-butyl-4-hydroxyphenyl) propionate] (trade name: Irganox 1035), octadecyl-3-(3,5-di-tert-butyl-4-hydroxyphenyl)propionate (trade name: Irganox 1076), N,N'-hexamethylenebis(3,5-di-tert-butyl-4-hydroxy-hydrocinnamide) (trade name: Irganox 1098), and the like. Among these, pentaerythrityl-tetrakis[3-(3,5-di-tert-butyl-4-hydroxyphenyl)propionate] is preferable from the perspective of high molecular weight, high compatibility with polypropylene and low volatility and good heat resistance.

The polypropylene resin composition preferably includes the hindered phenol-based antioxidant having a carbonyl group at 1000 ppm (based on mass) or greater and 10000 ppm (based on mass) or less, more preferably at 5000 ppm (based on mass) or greater and 7000 ppm (based on mass) or less, and even more preferably at 5500 ppm (based on mass) or greater and 7000 ppm (based on mass) or less, based on the polypropylene resin (100 parts by weight). This is because the hindered phenol-based antioxidant having a carbonyl group is substantially consumed in the extruder.

When the polypropylene resin composition does not contain the primary agent, the hindered phenol-based antioxidant having a carbonyl group may be used in a larger amount. The polypropylene resin composition preferably includes the hindered phenol-based antioxidant having a carbonyl group at 6000 ppm (based on mass) or greater and 8000 ppm (based on mass) or less based on the polypropylene resin (100 parts by weight), because the amount of consumption of the hindered phenol-based antioxidant having a carbonyl group in the extruder increases.

The polypropylene film of the present invention may include one or more types of the hindered phenol-based antioxidants having a carbonyl group (secondary agent) to inhibit degradation that proceeds over time during a long-term use. The polypropylene film of the present invention preferably includes the antioxidant above at 1000 ppm (based on mass) or greater and 10000 ppm (based on mass) or less, more preferably at 4000 ppm (based on mass) or greater and 6000 ppm (based on mass) or less, and even more preferably at 4500 ppm (based on mass) or greater and 6000 ppm (based on mass) or less, based on the polypropylene resin (100 parts by weight). The content in the film is preferably 4000 ppm (based on mass) or greater and 6000 ppm or less (based on mass), from the perspective of manifesting the appropriate effects.

A capacitor film, which contains a particular, appropriate range of amount of the hindered phenol-based antioxidant having a carbonyl group that has suitable miscibility with polypropylene on a molecular scale, is preferable because long-term durability is enhanced without reducing electrostatic capacitance (without allowing degradation to proceed)

over a long duration of over 100 hours even in the life test at extremely elevated temperatures such as 110° C. or higher, while high voltage resistance achieved through the internal structure (crystallite size), orientation (birefringence) and surface roughness (convexities volume) discussed above is maintained.

Note that the polypropylene resin composition experiences substantial thermal degradation (oxidation degradation) or shear degradation during the film formation step (especially in the extruder). The degree of progress in such degradations, i.e. the change in the molecular weight distribution or stereoregularity, can be suppressed by various conditions such as nitrogen purge in the extruder (suppression of oxidation), the shape of the screws in the extruder (sheer force), the internal shape of a T-die during casting, the amount of the antioxidant added (suppression of oxidation) and winding speed during casting (elongation force).

"A chlorine absorber" is generally called a chlorine absorber, and is used in polypropylene, and is not particularly limited as long as the object of the present invention can be obtained. Examples of the chlorine absorber include metal soap, such as calcium stearate.

"The cast sheet before stretching", i.e. unstretched cast sheet (may be referred to as "cast sheet" or "polypropylene cast sheet" hereinafter) for production of the polypropylene film of the present invention, can be formed using a publicly known method. For example, the polypropylene resin pellets, the dry-mixed polypropylene resin pellets (and/or polymer powder), or the mixed polypropylene resin pellets which are melted and kneaded in advance, i.e. the polypropylene resin composition in a pellet form, is supplied to the extruder. Next, the supplied polypropylene resin pellets and the like are preferably melted by heating to a temperature of 170° C. to 320° C., more preferably 200° C. to 300° C., even more preferably 230° C. to 270° C. Subsequently, the melted polypropylene resin composition may be passed through a percolation filter, if necessary. Next, the melted polypropylene resin composition is preferably extruded through a T-die while heating the composition to a temperature of 170° C. to 320° C., more preferably 200° C. to 300° C., even more preferably 230° C. to 270° C. The extruded polypropylene resin composition is solidified by cooling using at least one or more metal drum held at a temperature of 80° C. to 140° C., preferably 90 to 140° C. and even more preferably 90° C. to 105° C. This is performed by bringing the extruded polypropylene resin composition into contact with the metal drum. Thus, the unstretched cast sheet can be formed. The unstretched cast sheet thus obtained is preferably a polypropylene cast sheet in which the β-type spherulites are formed. In the polypropylene film of the present invention, the temperature of the group of the metal drums for forming the unstretched cast sheet to produce the polypropylene film having the desired surface topography, i.e. the elliptical shape density of 60/mm$^2$ or greater and 80/mm$^2$ or less, is preferably held at 90 to 140° C. (particularly 90° C. to 105° C.). In the polypropylene film of the present invention, the temperature of the group of the metal drums for forming the unstretched cast sheet to produce the polypropylene film having the desired surface topography, i.e. the total volume of convexities having a height of 0.4 µm of 50 µm$^3$ or greater and 150 µm$^3$ or less per 1 mm$^2$, is preferably held at 90 to 140° C. (particularly 90° C. to 105° C.). Note that (1) the method of heating the polypropylene resin (polypropylene resin composition), (2) a type of an extruder, conditions of extrusion and the like, (3) the method, the conditions and the like of bringing the extruded polypropylene resin composition into contact with the metal drum, (4) the physical properties and the like of the cast sheet, and (5) the conditions, the method and the like of stretching are the same as those described in "2. Production method of the biaxially stretched polypropylene film for capacitor of the present invention" below. Thus, refer to the description in the later section.

When the unstretched cast sheet is formed, by maintaining the temperature of the group of the metal drums at 80° C. to 140° C., preferably at 90° C. to 140° C., more preferably at 90° C. to 120° C. and even more preferably at 90 to 105° C., the β-crystal fraction of the obtained cast sheet determined by the X-ray method is 1% or greater and 50% or less, preferably 5% or greater and 30% or less, and even more preferably 5% or greater and 20% or less. Note that the value is for the method without the β-type spherulite nucleating agent.

The range of the β-crystal fraction described above can preferably achieve both capacitor characteristics and element winding processability.

The β-crystal fraction, sometimes called K value, can be obtained by X-ray diffraction measurement and calculated according to the method described in "A. Turner-Jones et al., Makromol. Chem., Vol. 75, p. 134 (1964)". That is, the proportion of β-crystal is expressed by the proportion of the sum of three diffraction pattern peak heights originating from α-crystal and one diffraction pattern peak height originating from β-crystal.

When the unstretched cast sheet is a polypropylene cast sheet, in which the β-type spherulite is formed, the average radius of the β-type spherulite is preferably 0.1 µm to 10 µm, more preferably 0.5 µm to 8 µm, and even more preferably 1 µm to 5 µm. In the present invention, the average radius of the β-type spherulites is the average of the radii measured for the all β-type spherulites confirmed in one view (460× 620 µm) using the polarization optical microscope (ECLIPSE E E200 manufactured by Nikon Co., Ltd.). For the measurement of the radius, ImagePro, the image analysis software by Nippon Roper K.K., is used.

The thickness of the cast sheet is not particularly limited as long as the biaxially stretched polypropylene film for capacitor of the present invention can be obtained, but in general, preferably from 0.05 mm to 2 mm, and more preferably from 0.1 mm to 1 mm.

The polypropylene film of the present invention can be produced by subjecting the polypropylene cast sheet to stretching treatment. As the stretching, biaxial stretching that stretches biaxially in orientations along longitudinal and lateral axes is preferably performed, and a successive biaxial stretching method is preferred. A successive biaxial stretching method includes maintaining the cast sheet at a temperature of 100 to 180° C., preferably 140 to 160° C. first, and stretching 3-fold to 7-fold, preferably 3.5-fold to 6-fold and more preferably 3.8-fold to 6-fold in the direction of flow (longitudinal direction) by passing the sheet between rolls provided with different speeds, and immediately cooling the sheet to room temperature. The appropriate adjustment of the temperature during the longitudinal stretching step can melt the β-crystal to transform into the α-crystal, to develop the concavities and convexities. After the stretched film is introduced to a tenter to stretch 3-fold to 11-fold, more preferably 5-fold to 10.5-fold, and even more preferably 7-fold to 10-fold in the width direction (transverse direction) at a temperature of 160° C. or higher, the film is subjected to relaxation and heat fixing, and then wound.

Note that the descriptions about (1) the method of heating the polypropylene resin composition, (2) a type of an extruder, conditions of extrusion and the like, (3) the method, the conditions and the like of bringing the extruded polypropylene resin composition into contact with the metal drum, (4) the physical properties and the like of the cast sheet, and (5) the conditions, the method and the like of stretching may be referred to in the descriptions in "2. Production method of the biaxially stretched polypropylene film for capacitor of the present invention" below as well as the items described above.

The wound film is subjected to aging treatment in an atmosphere at approximately 20 to 45° C., after which it can be cut into a desired product width.

The elliptical shape density of the polypropylene film of the present invention can be achieved by the conventionally known surface-roughening methods such as embossing method or etching method. Among these, the surface roughening method using the β-crystals is particularly preferable because it avoids the contamination by impurities. The formation proportion of the β-crystal can be adjusted by changing the characteristics of the molecular structure and the like of the polypropylene resin used. The formation proportion of the β-crystal can be controlled also by the casting temperature (i.e. the temperature of the group of the metal drums during the formation of the cast sheet) and the stretching condition such as rotation speeds of the group of the metal drums. Furthermore, the melting proportion of the β-crystal can be controlled by the temperature of the rolls during the longitudinal stretching step. The appropriate selection of the production conditions regarding the two parameters of the formation and melting of the β-crystal can control the surface characteristics.

The total volume of convexities having a height of 0.4 μm or greater of the polypropylene film of the present invention can be achieved by the conventionally known surface-roughening methods such as embossing method or etching method. Among these, the surface roughening method using the β-crystals is particularly preferable because it avoids the contamination by impurities. The formation proportion of the β-crystal can be adjusted by changing the characteristics of the molecular structure and the like of the polypropylene resin used. The formation proportion of the β-crystal can be controlled also by the casting temperature (i.e. the temperature of the group of the metal drums during the formation of the cast sheet) and the stretching condition such as rotation speeds of the group of the metal drums. Furthermore, the melting proportion of the β-crystal can be controlled by the temperature of the rolls during the longitudinal stretching step. The appropriate selection of the production conditions regarding the two parameters of the formation and melting of the β-crystal can control the surface characteristics.

The polypropylene film of the present invention is preferably a biaxially stretched film of a polypropylene cast sheet, in which a β-type spherulite is formed.

For the polypropylene film of the present invention, corona discharge treatment may be performed online or offline following the completion of the stretching and heat fixing steps to enhance adhesive properties in post-processing such as a metal deposition processing step. The corona discharge treatment can be performed by a publicly known method. As the atmosphere gas, air, carbon dioxide gas, nitrogen gas, or a mixed gas thereof are preferably used.

The polypropylene film obtained as above preferably has a thickness of 1.0 μm or greater and 6.0 μm or less, more preferably a thickness of 1.5 μm or greater and 4.0 μm or less, even more preferably a thickness of 1.8 μm or greater and 3.5 μm or less, particularly preferably a thickness of 1.8 μm or greater and less than 3.0 μm. The polypropylene film of the present invention is preferably a particularly thin film.

The thickness is measured in accordance with JIS C 2330 using a micrometer (JIS B 7502).

2. Method of Producing Biaxially Stretched Polypropylene Film for Capacitor of the Present Invention The method of producing of the present invention is a method of producing a biaxially stretched polypropylene film for capacitor having a change rate over time of tan $\delta$/tan $\delta_0$ of $5.0 \times 10^{-4}$ [1/hour] or less, wherein tan $\delta$/tan $\delta_0$ is a value of tan $\delta$ normalized by a value of tan $\delta_0$, tan $\delta$ [%] is a value measured at an elapsed time of between 0 hour and 500 hours, and tan $\delta_0$ [%] is an initial value measured at an elapsed time of 0 hour, in a long-term durability test at 105° C. and under an applied voltage of 600 V, the method sequentially including:

(1) heating a polypropylene resin composition;
(2) extruding a melted polypropylene resin composition obtained in step (1);
(3) bringing the polypropylene resin composition obtained in step (2) into contact with at least one metal drum; and
(4) stretching a cast sheet obtained in step (3) biaxially.

According to the method of producing the film of the present invention, the film of the present invention described above can be preferably produced.

Step 1

The method of production of the present invention includes the step 1 of heating the polypropylene resin composition. The step 1 can produce the melted resin composition.

The polypropylene resin composition to be melted may include only one type of the polypropylene resin or may include two or more types. The polypropylene resin composition preferably includes the polypropylene resin at 85 mass % to 100 mass %, more preferably 90 mass % to 100 mass %, even more preferably 95 mass % to 100 mass %, and particularly preferably 98 mass % to 100 mass %, based on the total mass of the polypropylene resin composition.

Here, the detailed descriptions about the polypropylene resin composition of the present invention, such as (a) description about the type, properties, content, methods of polymerization and the like of the resin which can be used to constitute the polypropylene resin composition, (b) description about the type, content and the like of the additives that can be included in the polypropylene resin composition, (c) the method of mixing resins and the like, and (d) the temperature of kneading are the same as the contents described in "1. Biaxially stretched polypropylene film for capacitor of the present invention" above. Therefore, the descriptions above are omitted.

In step 1, the temperature of heating the polypropylene resin composition is not particularly limited as long as the polypropylene resin composition melts at the temperature, but it is preferably in the range of 170 to 320° C., more preferably 200° C. to 300° C. and even more preferably 230° C. to 270° C. Heating the polypropylene resin composition in the temperature range above can melt the polypropylene resin composition uniformly and induce less degradation of the polypropylene resin and the other resin. The melted polypropylene resin composition may be passed through a percolation filter.

The polypropylene resin composition can be heated by a conventionally known method. For example, the polypropylene resin composition can be heated by an extruder including a heating apparatus. Such extruder is not particularly limited as long as it can heat the polypropylene resin composition, and for example, can be a single-screw extruder, or a multi-screw extruder with two or more screws.

When the polypropylene resin composition prepared by the dry-blend method is used, the multi-screw extruder is preferable because the polypropylene resin composition can be mixed sufficiently and the uniformly melted polypropylene resin composition can be obtained. When the extruder is used, the degradation of the polypropylene resin oxidation can be suppressed by purging inside the extruder with an inert gas such as nitrogen.

Step 2

The method of production of the present invention includes step 2 of extruding the melted polypropylene resin composition obtained in the step 1. In the step 2, the resin composition extruded into a sheet shape can be obtained.

The resin composition extruded into a sheet shape is a melted resin composition extruded, preferably into a thickness of 0.05 mm to 23 mm, more preferably 0.1 mm to 2 mm, and even more preferably 0.15 mm to 1 mm.

The melted polypropylene resin composition can be extruded by a conventionally known method, such as a T-die. The type or the shape of the T-die is not particularly limited.

When the resin composition is extruded using the T-die, the extrusion temperature of T-die is preferably 170° C. to 320° C., more preferably 200° C. to 300° C. and even more preferably 230° C. to 270° C.

Step 3

The method of producing the film of the present invention includes step 3 of bringing the polypropylene resin composition obtained from the step 2 into contact with at least one metal drum. In the step 3, the unstretched cast sheet can be obtained.

The thickness of the cast sheet is not particularly limited as long as the biaxially stretched polypropylene film for capacitor of the present invention can be obtained, but in general, preferably from 0.05 mm to 2 mm, and more preferably from 0.1 mm to 1 mm.

Examples of the method of bringing the extruded polypropylene resin composition into contact with at least one metal drum includes discharging the resin composition extruded into a sheet shape onto a rotating metal roll. More specifically, the resin composition is wound on at least one, preferably 2 to 5, more preferably 2 to 3 metal drums by discharging the resin composition extruded on the metal rolls.

In the step 3, the surface temperature of the metal drum is preferably maintained at 80° C. to 140° C., more preferably at 90 to 140° C., even more preferably at 90° C. to 120° C., and particularly preferably at 90° C. to 105° C. If the surface temperature of the metal drum is in the range of temperatures above, the β-crystal fraction of the cast sheet can be easily adjusted to the range described below. As a result, the elliptical shape density and the total volume of convexities within the range of the present invention can be obtained easily. As a result, the film of the present invention can easily achieve the desired change rate over time of tan δ/tan δ$_0$ above. Therefore, step 3 can be preferably performed at the preferable surface temperature of the metal drum above.

The β-crystal fraction of the obtained cast sheet determined by the X-ray method is preferably 1% or greater and 50% or less, more preferably 5% or greater and 30% or less and even more preferably 5% or greater and 20% or less. Note that the value is for the method without the β-type spherulite nucleating agent. The β-crystal fraction can be measured described as above.

The method of contacting is not particularly limited but examples thereof include discharging the resin composition extruded into a sheet shape onto a rotating metal roll. Thus, the resin composition extruded into a sheet shape can be cooled uniformly.

Step 4

The method of producing the film of the present invention includes step 4 of biaxially stretching the cast sheet obtained in step 3 above. In step 4, the biaxially stretched polypropylene film can be obtained. Step 4 includes stretching in the direction of flow and stretching in the width direction.

Methods of biaxially stretching the cast sheet include the publicly known methods such as stretching between rolls with different radial speeds, tenter method, and tubular method. The direction of stretching can include uniaxial stretching, biaxial stretching and biaxial stretching in oblique angle. And stretching in two or more axes can include successive stretching and simultaneous stretching. Among these, simultaneous biaxial stretching using the tenter method, successive biaxial stretching using the tenter method, and successive biaxial stretching, in which stretching between rolls with different radial speeds in the longitudinal direction (direction of flow, MD) followed by stretching in the transverse direction (width direction, TD) by the tenter method, are preferable. And successive biaxial stretching, in which stretching between rolls with different radial speeds in the longitudinal direction (direction of flow, MD) followed by stretching in the transverse direction (width direction, TD) by the tenter method is more preferable.

Step 4 includes stretching the cast sheet at a temperature of 100 to 180° C., preferably 140 to 160° C.

If the successive biaxial stretching is used, the stretching temperature and stretching ratio needs to be adjusted according to the melting point and glass transition temperature of the resin used. First, the cast sheet is maintained preferably at 100 to 180° C., more preferably at 140 to 160° C., more preferably at 144 to 160° C. and even more preferably at 144° C. to 150° C. If the temperature of the cast sheet is within the temperature range above, the β-crystal melts during the stretching in the longitudinal direction, i.e. the direction of flow, and transforms into the α-crystal via crystalline transformation, leading to the formation of the crater-like concavities and convexities. Then, the desired elliptical shape density and/or total volume of convexities in the present invention can be obtained. As a result, the film of the present invention can easily achieve the desired change rate over time of tan δ/tan δ$_0$ above. Therefore, step 4 can be preferably performed at the preferable stretching temperature during the stretching in the direction of flow.

The cast sheet is preferably stretched to 3-fold to 7-fold, more preferably 3.5-fold to 6.5-fold, and even more preferably 3.8-fold to 6-fold, in the longitudinal direction (direction of flow) via transporting between rolls with different radial speeds or by the tenter method.

The uniaxially stretched film can be obtained after stretching followed by relaxation of the tension applied to the film.

Next, said uniaxially stretched film is maintained preferably at 140° C. or higher, more preferably at 150° C. or higher, and even more preferably at 160° C. or higher. The preferable upper limit of the stretching temperature of the uniaxially stretched film is 180° C., for example. If the temperature of said uniaxially stretched film is within the range of temperature above, the uniformly biaxially stretched film can be obtained. As a result, the convexities observed as (substantially) circular shapes and elliptical shapes with the elliptical shape density and the total volume of convexities of the present invention can be obtained in stretching in the transverse direction, i.e. the width direction, from the crater-like concavities and convexities formed in stretching in the longitudinal direction. Said uniaxially stretched film is stretched in the transverse direction (width direction), preferably at 3 to 11-fold, more preferably at 5 to 10.5-fold, and even more preferably at 7 to 10-fold, using the tenter method. The biaxially stretched film can be obtained after stretching followed by relaxation of the tension applied to the film.

The biaxially stretched polypropylene film obtained is a biaxially stretched polypropylene film for capacitor having a change rate over time of tan $\delta$/tan $\delta_0$ of $5.0\times10^{-4}$ [1/hour] or less, wherein tan $\delta$/tan $\delta_0$ is a value of tan $\delta$ normalized by a value of tan $\delta_0$, tan $\delta$ [%] is a value measured at an elapsed time of between 0 hour and 500 hours, and tan $\delta_0$ [%] is an initial value measured at an elapsed time of 0 hour, in a long-term durability test at 105° C. and under an applied voltage of 600 V.

The obtained biaxially stretched film has a thickness similar to the thickness described in "1. Biaxially stretched polypropylene film for capacitor of the present invention".
Other Steps The method of producing the film of the present invention can include other steps in addition to the Step 1 to 4 described above. Examples of the other steps include a slitting step, a winding step, a surface roughening step, and a metal deposition processing step.

The slitting step is preferably performed after biaxially stretching and before winding the biaxially stretched film. By the slitting step, the film can be slitted into any product width.

The method of producing the film of the present invention may further include a metal deposition processing step, in which the metal coating is deposited on one surface or both surfaces of the biaxially stretched polypropylene sheet. Also, the method may further include a step in which corona discharge treatment may be performed online or offline following the completion of the stretching and heat fixing steps to enhance adhesive properties in post-processing such as a metal deposition processing step. The corona discharge treatment can be performed by a publicly known method. As the atmosphere gas, air, carbon dioxide gas, nitrogen gas, or a mixed gas thereof are preferably used.

In the winding step, the biaxially stretched film can be wound to a desired length.

3. Use and Method for a Use of Biaxially Stretched Polypropylene Film of the Present Invention as a Capacitor Use or the method for a use of the polypropylene film of the present invention is use or a method for a use of a film as a film for a capacitor, the film having a change rate over time of tan $\delta$/tan $\delta_0$ of $5.0\times10^{-4}$ [1/hour] or less, wherein tan $\delta$/tan $\delta_0$ is a value of tan $\delta$ normalized by a value of tan $\delta_0$, tan $\delta$ [%] is a value measured at an elapsed time of between 0 hour and 500 hours, and tan $\delta_0$ [%] is an initial value measured at an elapsed time of 0 hour, in a long-term durability test at 105° C. and under an applied voltage of 600 V.

The polypropylene film of the present invention has a large initial voltage resistance and superior long-term voltage resistance. Also, winding suitability of the element is superior because the surface thereof is appropriately rough. Furthermore, the capacitor may easily achieve the high electrostatic capacitance because the thickness can be very thin. Accordingly, the polypropylene film of the present invention can be used very suitably as a small and high capacity capacitor having the electrostatic capacitance of 5 µF or greater, more preferably 10 µF or greater, and even more preferably 20 µF or greater.

The capacitor including a metallized film of the present invention exhibits a small decrease in the electrostatic capacitance even when a voltage is applied at an elevated temperature for a long duration. For example, the change in the electrostatic capacitance ΔC is 0% to −20% even when a DC voltage of 600 V is applied for 1500 hours in an environment of 105° C. Thus, the polypropylene film of the present invention can be suitably used in a capacitor.

The capacitor in which the polypropylene film of the present invention can be used is not particularly limited, but may be a flat capacitor. Also, the polypropylene film of the present invention can be used in a high voltage capacitor; a filtering and smoothing capacitor for various switching power supplies, converters and inverters; and a smoothing capacitor for an inverter power circuit that controls a driving motor used in an electric car or hybrid car, for example.

In the method in which the polypropylene film of the present invention is used as a film for a capacitor, an electrode can be attached to the polypropylene film of the present invention to be processed as a capacitor. Such an electrode is not particularly limited as long as the capacitor of the object of the present invention can be obtained, and a typical electrode used for producing the capacitor can be used. Examples of the electrode include a metal foil, a paper, plastic film, or the like metallized on at least one surface thereof.

There will be an increasing demand for miniaturization and lighter weight for a capacitor, and thus, it is preferable to form an electrode by directly metallizing one surface or both surfaces of the film of the present invention. By forming the electrode, the film having a metal coating on one surface or both surfaces of the polypropylene film of the present invention (the metallized film of the present invention) can be obtained. Examples of a metal used in the metal coating include elemental metals such as zinc, lead, silver, chromium, aluminum, copper, and nickel, a combination of plural elements thereof, and an alloy thereof. Considering environmental, economic aspects and performance of the capacitor, the metal used in the metal coating is preferably at least one selected from the group consisting of zinc and aluminum.

The film resistance of the metal vapor deposition film is preferably from 1 to 100Ω/□ from the perspective of electrical properties of the capacitor. From the perspective of self healing characteristics, the film resistance is preferably relatively high within this range, and more preferably 5Ω/□ or greater, and even more preferably 10Ω/□ or greater. Furthermore, from the perspective of safety as a capacitor element, the film resistance is more preferably 50Ω/□ or less, and even more preferably 20Ω/□ or less. The film resistance of the metal deposition film can be measured during metal deposition by, for example, two-terminal sensing that is known to one skilled in the art. The film resistance of the metal deposition film can be adjusted by adjusting the vaporized amount by adjusting the output of the vaporization source for example. The thickness of the metal coating is not particularly limited, but is preferably 10 nm to 100 nm.

When the metal deposition film is formed on one surface of the film, an insulating margin is formed by excluding a certain width from an edge of one surface of the film from the deposition so that a capacitor is formed when the film is wound. Furthermore, to strengthen the bonding between the metallized polypropylene film and the metalicon electrodes, a heavy edge structure is preferably formed on the other edge relative to the insulating margin. The film resistance of the heavy edge is preferably 2 to 8Ω/□, and more preferably 3 to 6 Ω/□.

The method of directly metallizing the surface of the polypropylene film of the present invention is not particularly limited as long as the capacitor of the object of the present invention can be obtained, and may include vacuum deposition and sputtering method, for example. From the perspective of productivity and economy, vacuum deposition is preferred. Examples of the vacuum deposition generally include the crucible method and wire method. The method is not particularly limited as long as the capacitor of the object of the present invention can be obtained and the suitable method can be employed as appropriate.

The margin pattern during the metalization by vacuum deposition is not particularly limited. But from the perspective of improving the characteristics of the capacitor such as security, patterns including so-called special margins such as a fishnet pattern and a T-margin pattern can be applied on one surface of the film of the present invention. When the pattern is formed on one surface of the film of the present invention, the security of the capacitor improves and tends to suppress the destruction of the capacitor or shorting.

Generally known methods such as a tape method and oil method can be used without limitation as a method of forming the margins.

When the flat capacitor is produced, the film of the present invention with an electrode attached, or metalized, may be wound. A single piece of the film can be used or two or more pieces of the film can be used together to be wound and two or more pieces of the film are preferably used. The number of turns in winding can be selected as appropriate according to the use of the capacitor, and for example, a flat capacitor can have about 500 to 2000 turns. Winding can be performed using an automatic winder. The wound element can be heat-treated under applied pressure and/or heating. The pressure can be 200 to 1000 kPa, for example. The temperature can be 60 to 130° C., for example. Metal zinc is melt-injected to the end surface of the heat-treated element. Thus, the flat capacitor can be obtained.

4. Capacitor of the Present Invention

The capacitor of the present invention is a capacitor including a metallized film including a film of the present invention and a metal coating on one surface or both surfaces of the film. The capacitor of the present invention includes a biaxially stretched polypropylene film for capacitor.

The capacitor of the present invention may be a small and high capacity capacitor having the electrostatic capacitance of 5 µF or greater, more preferably 10 µF or greater, and even more preferably 20 µF or greater.

The capacitor of the present invention exhibits a small decrease in the electrostatic capacitance even when a voltage is applied at an elevated temperature for a long duration. For example, the change in the electrostatic capacitance ΔC is 0% to −20% even when the DC voltage of 600 V is applied for 1500 hours in an environment of 105° C.

The capacitor of the present invention can be used is not particularly limited, but may be a flat capacitor.

The capacitor of the present invention may be used as a high voltage capacitor; a filtering and smoothing capacitor for various switching power supplies, converters and inverters; a smoothing capacitor for an inverter power circuit that controls a driving motor used in an electric car or hybrid car, for example.

The capacitor of the present invention can be produced using a conventionally known method. For example, the capacitor of the present invention can be produced using a metallized film including a film of the present invention and a metal coating on the one surface or both surfaces of the film as described above.

The present invention will be further described in detail using examples; however, the present invention is not limited to these.

EXAMPLES $\tan \delta / \tan \delta_0$

The values of tan δ of the capacitor elements produced in the examples and comparative examples were measured using LCR Hi-Tester 3522-50 manufactured by Hioki E.E. Corporation. The measurements were performed at a certain time between 0 hour to 1500 hours of the elapsed time. For 5 capacitor elements, the value of $\tan \delta / \tan \delta_0$ was calculated from tan δ, the value at each measurement time, normalized by $\tan \delta_0$, the initial value (tan δ at the elapsed time of 0 hour). The average value of $\tan \delta / \tan \delta_0$ of the 5 capacitor elements at each measurement time was determined.

Change in the Electrostatic Capacitance ΔC

The values of electrostatic capacitance of the capacitor elements produced in the examples and comparative examples were measured using LCR Hi-Tester 3522-50 manufactured by Hioki E.E. Corporation. The measurements were performed at a certain time between 0 hour to 1500 hours of the elapsed time. For 5 capacitor elements, the change in the electrostatic capacitance ΔC [%] was calculated, which is a proportion [%] obtained by dividing a difference obtained by subtracting the initial electrostatic capacitance (the electrostatic capacitance at the elapsed time of 0 hour) from the electrostatic capacitance at each measurement time, by the initial electrostatic capacitance (the electrostatic capacitance at the elapsed time of 0 hour). The average value of the change in the electrostatic capacitance ΔC [%] of the 5 capacitor elements at each measurement time was determined.

Total Volume of Convexities Having a Height of 0.4 µm or Greater Per 1 $mm^2$

For the polypropylene film produced in the examples and comparative examples below, the total volumes of convexities were measured as follows. "VertScan 2.0 (Model: R5500GML)" manufactured by Hishika Systems Co. Ltd., was used as the light interferometric non-contact surface profiler. The measurement employed "WAVE Mode", using a 530 white filter and a ×20 (magnification of 20) objective lens. 10 arbitrary points on the surface of the film to be observed were measured, each point being an area of 240 µm×180 µm of the field view. The obtained data underwent the noise-removal process using a median filter. Thereafter, the data also underwent the Gaussian filter process with the cutoff value of 30 µm. Thus, the wavy component was removed. Thus, the rough surface of the film could be appropriately evaluated. The total volume of convexities was determined using the plugin function "Bearing" in "VS-Viewer", the analysis software of the "VertScan 2.0". "Threshold Value for Positive Height" was set to 0.4 µm. Then, the value displayed as "Volume for Positive Height" was recorded as a total volume of convexities in one field view. The measurement was performed for 10 points. The average value of the measurements was determined. Then the average value was divided by the area of the field view (0.237 mm×0.178 mm=0.0422 $mm^2$), to obtain "the total volume of convexities having a height of 0.4 µm or greater per 1 $mm^2$ [unit: $µm^3/mm^2$]" was obtained. Note that the reference plane for each measurement point was defined as a height of the "wavy component" obtained upon the Gaussian filtering process.

Elliptical Shape Density

For the polypropylene films produced in examples and comparative examples below, the numbers of (substantially) circular shapes and (substantially) elliptical shapes were measured using VHX-2000 digital microscope manufactured by Keyence Corp. The measurement conditions are as follows.

Lens Power: 100×
Measurement Method: reflection mode
Area of Field View: 3.4 mm×2.6 mm Weight Average Molecular Weight (Mw), Molecular Weight Distribution (Mw/Mn), and Difference (DM)

Using gel permeation chromatography (GPC), the measurements were performed under the following conditions.

Measuring instrument: High-temperature GPC with built-in differential refractometer (RI)

Model HLC-8121GPC-HT, manufactured by Tosoh Corporation

Column: Three coupled TSKgel GMHHR-H(20)HT columns, manufactured by Tosoh Corporation Column temperature: 145° C.
Eluent: Trichlorobenzene
Flow rate: 1.0 mL/min The calibration curve was obtained by using the polystyrene standard manufactured by Tosoh Corporation, and the measurement results were converted to the value for polypropylene.

Mesopentad Fraction

The mesopentad fraction was measured using an NMR instrument using the following conditions.

High temperature nuclear magnetic resonance (NMR) instrument: JNM-ECP500, high temperature Fourier transform nuclear magnetic resonance (high temperature FT-NMR), manufactured by JEOL Ltd.

Observed nucleus: $^{13}C$ (125 MHz)
Measurement temperature: 135° C.
Solvent: a mixed solvent of ortho-dichlorobenzene ODCB and deuterated ODCB (Mixed proportion: 4:1)
Measurement mode: single-pulse proton broad-band decoupling
Pulse width: 9.1 μsec (45° pulse)
Pulse interval: 5.5 sec
Number of data cumulation: 4500
Chemical shift standard: $CH^3$ (mmmm)=21.7 ppm Average Radius of β-Type Spherulite Among the polypropylene cast sheets, the surface of the polypropylene cast sheet, which had been measured for total volume of convexities and the elliptical shape density for the stretched film, was observed by the polarization optical microscope (ECLIPSE E E200, manufactured by Nikon Co., Ltd.). The radii of all the β-type spherulites confirmed in the field view (460×620 μm) were measured. The average radius was determined from the average of the obtained radii. For the measurement of the radius, ImagePro, the image analysis software by Nippon Roper K.K., is used.

β-Crystal Fraction

β-crystal fraction was evaluated using the K value obtained by X-ray diffraction measurement.

The X-ray diffraction measurement was performed as follows.

Measuring instrument: Benchtop X-ray diffraction (XRD) instrument, MiniFlex 300, manufactured by Rigaku Corporation X-ray source: CuKα line
X-ray generation output: 30 kV, 10 mA
Irradiated X-ray: Monochromatic CuKα radiation by monochromator (wavelength: 1.5418 Å)
Detector: Scintillation counter
Goniometer scanning: Coupled 2θ/θ scan
K value was calculated using the following equation:

$K$value(Intensity proportion %)=$H\beta/(H\beta+H\alpha I+H\alpha II+H\alpha III)\times 100$ which is the proportion of the sum of three diffraction pattern peak heights originating from the α-crystal and one diffraction pattern peak height originating from the β-crystal. Note that the equation above can also be expressed as $$K \text{ value (Intensity ratio \%)} = \frac{H\beta \times 100}{H\beta + H\alpha I + H\alpha II + H\alpha III} \quad \text{[Equation 2]}$$

Hβ is a peak intensity (height) corresponding to the crystalline diffraction of the β-crystal (2θ=16 deg), HαI is a peak intensity (height) corresponding to the crystalline diffraction of the (110) face of α-crystal, HαII is a peak intensity (height) corresponding to the crystalline diffraction of the (040) face of α-crystal, and HαIII is a peak intensity (height) corresponding to the crystalline diffraction of the (130) face of α-crystal. Note that as the intensity (height), an intensity (height), from which the non-crystalline scattering was subtracted, was used.

Thickness of Biaxially Stretched Polypropylene Film

The thickness of the biaxially stretched polypropylene film was measured in accordance with JIS C 2330 using a micrometer (JIS B 7502).

Maximum Convexity Height (Sp)

For the polypropylene film produced in the examples and comparative examples below, the maximum convexity heights (Sp) were measured as follows. "VertScan 2.0 (Model: R5500GML)" manufactured by Hishika Systems Co. Ltd., was used as the light interferometric non-contact surface profiler. The measurement employed "WAVE Mode", using a 530 white filter and a ×20 (magnification of 20) objective lens. 10 arbitrary points on the surface of the film to be observed were measured, each point being an area of 240 μm×180 μm of the field view. The obtained data underwent the noise-removal process using a median filter. Thereafter, the data also underwent the Gaussian filter process with the cutoff value of 30 μm. Thus, the wavy component was removed. Thus, the rough surface of the film could be appropriately evaluated. The average value of the measurement values at 10 points above was calculated. The average value was recorded as the maximum convexity height (Sp).

Example 1

Preparation of Cast Sheet

PP resin A (Mw: 320000, Mw/Mn: 9.3, Difference (DM): 11.2% (in the differential molecular weight distribution curve, a difference obtained by subtracting the differential distribution value at the Log(M) of 6.0 from the differential distribution value at the Log(M) of 4.5, based on the differential distribution value at the Log(M) of 6.0 as 100% (reference), Mesopentad fraction [mmmm]: 95%, manufactured by Prime Polymer Co., Ltd.) and PP resin B (Mw:

350000, Mw/Mn: 7.7, Difference (DM): 7.2%, Mesopentad fraction [mmmm]: 96.5%, manufactured by Korea Petrochemical Ind. Co., Ltd.) were introduced to an extruder at the weight proportion of 65:35. The polypropylene resin composition was made by mixing and kneading the introduced PP resin A and PP resin B in the extruder. Next, the polypropylene resin composition including the polypropylene resins was melted at the resin temperature of 250° C., Thereafter, the melted polypropylene resin composition was extruded using a T-die. The extruded polypropylene resin composition was wound around the metal drum, the surface temperature of which was maintained at 97° C., to be solidified. Thus, the cast sheet was prepared. The obtained cast sheet had the average radius of the β-type spherulite of 1.7 μm and the β-crystal fraction of 13%.

Production of Biaxially Stretched Polypropylene Film

The obtained unstretched cast sheet, maintained at the temperature of 145° C., was transported between rolls with different radial speeds. Thus, the unstretched cast sheet was stretched 3 to 7-fold in the direction of flow. Immediately thereafter, the uniaxially stretched film was cooled to room temperature. Said uniaxially stretched film was introduced into the tenter. The uniaxially stretched film was stretched 3 to 11-fold in the width direction at a temperature of 160° C. or higher. The biaxially stretched film thus obtained was subjected to relaxation and heat fixing. Then the biaxially stretched film was wound. The wound biaxially stretched film was subjected to an aging process in the environment of about 20 to 45° C. Thus, the biaxially stretched polypropylene film having the thickness of 2.3 μm was obtained.

For the obtained biaxially stretched polypropylene film, the total volume of convexities having a height of 0.4 μm per 1 mm$^2$ or greater, the elliptical shape density and the maximum convexity height (Sp) were measured. The results are shown in Table 1.

Production of Capacitor

The capacitor was produced using the obtained polypropylene film as follows. Aluminum deposition of a Tl margin deposition pattern was performed on the biaxially stretched polypropylene film at the deposition resistance of 15Ω/□. Thus, the metallized film was obtained. The metallized film was slit into a 60 mm width. Two metallized films were brought together. The metallized films brought together were wound for 1076 turns at 200 g winding tension using the automatic winder 3KAW-N2 manufactured by Kaido Mfg. Co., Ltd. The wound element was subjected to heat treatment at 120° C. for 15 hours while being pressed. Metal zinc was melt-injected to the end surface of the element. Thus, the flat capacitor was obtained. The lead wires were soldered at the end surface of the flat capacitor. Thereafter, the flat capacitor was sealed with epoxy resin. The completed capacitor had an electrostatic capacitance of 75 μF (±5 μF).

The DC voltage of 600V was applied to the obtained capacitor in accordance with the method described above, at the testing environment temperature of 105° C. for 1500 hours in the convection-type constant temperature oven FC-610, manufactured by Advantec. The electrostatic capacitance and tan δ was measured at 0 hour, 100 hours, 200 hours, 300 hours, 400 hours, 500 hours, 1000 hours and 1500 hours. The change rate over time of tan δ/tan δ$_0$, Δ(tan δ), and change in the electrostatic capacitance ΔC were determined. The results are shown in Table 1. Also, the value of tan δ measured at each elapsed time was shown in Table 2.

Example 2

The biaxially stretched polypropylene film and the capacitor were produced in the same manner as in Example 1 except that the surface temperature of the metal drum used in the preparation of the cast sheet was maintained at 100° C. instead of 97° C. Then, the biaxially stretched polypropylene film and the capacitor produced were evaluated. The results are shown in Table 1 and 2.

Example 3

The biaxially stretched polypropylene film and the capacitor were produced in the same manner as in Example 1 except that the unstretched cast sheet was stretched in the direction of flow at the temperature of 144° C. during the production of the biaxially stretched polypropylene film (i.e. the temperature, at which the unstretched cast sheet was maintained, was 144° C. instead of 145° C. regarding the stretching in the direction of flow during the production of the biaxially stretched polypropylene film). The results are shown in Table 1 and 2.

Example 4

The biaxially stretched polypropylene film and the capacitor were produced in the same manner as in Example 1 except that the cast sheet was prepared using the PP resin A alone as a raw material instead of using the PP resin A and PP resin B as raw materials. Then, the biaxially stretched polypropylene film and the capacitor produced were evaluated. The results are shown in Table 1 and 2.

Example 5

The biaxially stretched polypropylene film and the capacitor were produced in the same manner as in Example 1 except that the surface temperature of the metal drum used in the preparation of the cast sheet was maintained at 95° C. instead of 97° C. Then, the biaxially stretched polypropylene film and the capacitor produced were evaluated. The results are shown in Table 1 and 2.

Example 6

The biaxially stretched polypropylene film and the capacitor were produced in the same manner as in Example 1 except that the surface temperature of the metal drum used in the preparation of the cast sheet was maintained at 100° C. instead of 97° C. and the unstretched cast sheet was stretched in the direction of flow at the temperature of 144° C. during the production of the biaxially stretched polypropylene film (i.e. the temperature, at which the unstretched cast sheet was maintained, was 144° C. instead of 145° C. regarding the stretching in the direction of flow during the production of the biaxially stretched polypropylene film). Then, the biaxially stretched polypropylene film and the capacitor produced were evaluated. The results are shown in Table 1 and 2.

Example 7

The biaxially stretched polypropylene film and the capacitor were produced in the same manner as in Example 1 except that the surface temperature of the metal drum used in the preparation of the cast sheet was maintained at 95° C. instead of 97° C. and the unstretched cast sheet was stretched in the direction of flow at the temperature of 144° C. during the production of the biaxially stretched polypropylene film (i.e. the temperature, at which the unstretched cast sheet was maintained, was 144° C. instead of 145° C.

regarding the stretching in the direction of flow during the production of the biaxially stretched polypropylene film). Then, the biaxially stretched polypropylene film and the capacitor produced were evaluated. The results were shown in Table 1 and 2.

Example 8

The biaxially stretched polypropylene film and the capacitor were produced in the same manner as in Example 1 except that the cast sheet was prepared using the PP resin A alone as a raw material instead of using the PP resin A and PP resin B as raw materials and the surface temperature of the metal drum used in the preparation of the cast sheet was maintained at 95° C. instead of 97° C. Then, the biaxially stretched polypropylene film and the capacitor produced were evaluated. The results are shown in Table 1 and 2.

Example 9

The biaxially stretched polypropylene film and the capacitor were produced in the same manner as in Example 1 except that the PP resin A, PP resin B and PP resin C1 as raw materials (the long-chain branched polypropylene resin, WB135HMS manufactured by Borealis AG) were introduced to the extruder at the mass ratio (proportion) of 64:34:2 instead of introducing the PP resin A and PP resin B as raw materials to the extruder at the weight ratio of 65:35, and the surface temperature of the metal drum was maintained at 99° C. instead of 97° C. during the preparation of the cast sheet, and the unstretched cast sheet was stretched in the direction of flow at the temperature of 144° C. instead of 145° C. during the production of the biaxially stretched polypropylene film. Then, the biaxially stretched polypropylene film and the capacitor produced were evaluated. The results are shown in Table 1 and 2.

Comparative Example 1

The biaxially stretched polypropylene film and the capacitor were produced in the same manner as in Example 1 except that the surface temperature of the metal drum used in the preparation of the cast sheet was maintained at 88° C. instead of 97° C. and the unstretched cast sheet was stretched in the direction of flow at the temperature of 138° C. during the production of the biaxially stretched polypropylene film (i.e. the temperature, at which the unstretched cast sheet was maintained, was 138° C. instead of 145° C. regarding the stretching in the direction of flow during the production of the biaxially stretched polypropylene film). Then, the biaxially stretched polypropylene film and the capacitor produced were evaluated. The results are shown in Table 1 and 2.

Comparative Example 2

The biaxially stretched polypropylene film and the capacitor were produced in the same manner as in Example 1 except that the surface temperature of the metal drum used in the preparation of the cast sheet was maintained at 88° C. instead of 97° C. and the unstretched cast sheet was stretched in the direction of flow at the temperature of 140° C. during the production of the biaxially stretched polypropylene film (i.e. the temperature, at which the unstretched cast sheet was maintained, was 140° C. instead of 145° C. regarding the stretching in the direction of flow during the production of the biaxially stretched polypropylene film). Then, the biaxially stretched polypropylene film and the capacitor produced were evaluated. The results are shown in Table 1 and 2.

Comparative Example 3

The biaxially stretched polypropylene film and the capacitor were produced in the same manner as in Example 1 except that the surface temperature of the metal drum used in the preparation of the cast sheet was maintained at 89° C. instead of 97° C. and the unstretched cast sheet was stretched in the direction of flow at the temperature of 140° C. during the production of the biaxially stretched polypropylene film (i.e. the temperature, at which the unstretched cast sheet was maintained, was 140° C. instead of 145° C. regarding the stretching in the direction of flow during the production of the biaxially stretched polypropylene film). Then, the biaxially stretched polypropylene film and the capacitor produced were evaluated. The results are shown in Table 1 and 2.

Comparative Example 4

The biaxially stretched polypropylene film and the capacitor were produced in the same manner as in Example 1 except that the cast sheet was prepared using the PP resin C2 (Mw: 300000, Mw/Mn: 4.1, Difference (DM): 4.6, Mesopentad fraction [mmmm]: 94.0%, manufactured by Prime Polymer Co., Ltd.) alone instead of using the PP resin A and PP resin B. Then, the biaxially stretched polypropylene film and the capacitor produced were evaluated. The results are shown in Table 1 and 2.

Comparative Example 5

The biaxially stretched polypropylene film and the capacitor were produced in the same manner as in Example 1 except that the surface temperature of the metal drum used in the preparation of the cast sheet was maintained at 88° C. instead of 97° C. and the unstretched cast sheet was stretched in the direction of flow at the temperature of 142° C. during the production of the biaxially stretched polypropylene film (i.e. the temperature, at which the unstretched cast sheet was maintained, was 142° C. instead of 145° C. regarding the stretching in the direction of flow during the production of the biaxially stretched polypropylene film). Then, the biaxially stretched polypropylene film and the capacitor produced were evaluated. The results are shown in Table 1 and 2.

Comparative Example 6

The biaxially stretched polypropylene film and the capacitor were produced in the same manner as in Example 1 except that the surface temperature of the metal drum used in the preparation of the cast sheet was maintained at 89° C. instead of 97° C. and the unstretched cast sheet was stretched in the direction of flow at the temperature of 142° C. during the production of the biaxially stretched polypropylene film (i.e. the temperature, at which the unstretched cast sheet was maintained, was 142° C. instead of 145° C. regarding the stretching in the direction of flow during the production of the biaxially stretched polypropylene film). Then, the biaxially stretched polypropylene film and the capacitor produced were evaluated. The results are shown in Table 1 and 2.

Comparative Example 7

The biaxially stretched polypropylene film and the capacitor were produced in the same manner as in Example 1 except that the surface temperature of the metal drum used in the preparation of the cast sheet was maintained at 88° C. instead of 97° C. and the unstretched cast sheet was stretched in the direction of flow at the temperature of 143° C. during the production of the biaxially stretched polypropylene film (i.e. the temperature, at which the unstretched cast sheet was maintained, was 143° C. instead of 145° C. regarding the stretching in the direction of flow during the production of the biaxially stretched polypropylene film). Then, the biaxially stretched polypropylene film and the capacitor produced were evaluated. The results are shown in Table 1 and 2.

Comparative Example 8

The biaxially stretched polypropylene film and the capacitor were produced in the same manner as in Example 1 except that the surface temperature of the metal drum used in the preparation of the cast sheet was maintained at 89° C. instead of 97° C. and the unstretched cast sheet was stretched in the direction of flow at the temperature of 143° C. during the production of the biaxially stretched polypropylene film (i.e. the temperature, at which the unstretched cast sheet was maintained, was 143° C. instead of 145° C. regarding the stretching in the direction of flow during the production of the biaxially stretched polypropylene film). Then, the biaxially stretched polypropylene film and the capacitor produced were evaluated. The results are shown in Table 1 and 2.

Comparative Example 9

The biaxially stretched polypropylene film and the capacitor were produced in the same manner as in Example 1 except that the surface temperature of the metal drum used in the preparation of the cast sheet was maintained at 87° C. instead of 97° C. and the unstretched cast sheet was stretched in the direction of flow at the temperature of 143° C. during the production of the biaxially stretched polypropylene film (i.e. the temperature, at which the unstretched cast sheet was maintained, was 143° C. instead of 145° C. regarding the stretching in the direction of flow during the production of the biaxially stretched polypropylene film). Then, the biaxially stretched polypropylene film and the capacitor produced were evaluated. The results are shown in Table 1 and 2.

Comparative Example 10

The biaxially stretched polypropylene film and the capacitor were produced in the same manner as in Example 1 except that the cast sheet was prepared using the PP resin C2 [Mw: 300000, Mw/Mn: 4.1, Difference (DM): 4.6, Mesopentad fraction [mmmm]: 94.0%, manufactured by Prime Polymer Co., Ltd.] alone as a raw material instead of using the PP resin A and PP resin B as raw materials and the surface temperature of the metal drum used in the preparation of the cast sheet was maintained at 95° C. instead of 97° C. Then, the biaxially stretched polypropylene film and the capacitor produced were evaluated. The results are shown in Table 1 and 2.

TABLE 1

| | Parameters regarding the electric properties | | Parameters regarding the surface topography | | | | | |
|---|---|---|---|---|---|---|---|---|
| | Change rate over time of $\tan\delta/\tan\delta_0$ | | Total volume of convexities having a height of 0.4 μm or greater per 1 mm² | Elliptical shape density | Maximum convexity height (Sp) | Change in the electrostatic capacitance ΔC [%] | | |
| | [1/hour] | Δ (tanδ) | [μm³/mm²] | [/mm²] | [μm] | 500 [h] | 1000 [h] | 1500 [h] |
| Example 1 | 3.5 × 10⁻⁴ | 0.03 | 61 | 81 | 0.62 | −0.7 | −5.9 | −14.8 |
| Example 2 | 4.0 × 10⁻⁴ | 0.33 | 123 | 86 | 0.69 | −0.5 | −5.5 | −14.2 |
| Example 3 | 2.2 × 10⁻⁴ | −1.13 | 85 | 62 | 0.57 | −0.4 | −4.5 | −12.8 |
| Example 4 | 4.7 × 10⁻⁴ | 0.45 | 141 | 70 | 0.78 | −0.9 | −8.5 | −19.6 |
| Example 5 | 4.4 × 10⁻⁴ | 0.13 | 58 | 79 | 0.54 | −0.5 | −6.3 | −15.5 |
| Example 6 | 3.4 × 10⁻⁴ | 0.30 | 31 | 73 | 0.69 | −2.8 | −9.2 | −18.2 |
| Example 7 | 1.7 × 10⁻⁴ | −1.24 | 89 | 63 | 0.62 | −0.5 | −4.9 | −14.2 |
| Example 8 | 4.7 × 10⁻⁴ | 0.43 | 148 | 70 | 0.82 | −1.8 | −10.5 | −19.1 |
| Example 9 | 4.2 × 10⁻⁴ | 1.71 | 2 | 101 | 0.62 | −0.4 | −8.0 | −19.3 |
| Comparative Example 1 | 18.5 × 10⁻⁴ | 0.70 | 14 | 80 | 0.32 | −2.8 | −15.1 | −23.8 |
| Comparative Example 2 | 9.2 × 10⁻⁴ | 1.00 | 41 | 92 | 0.52 | −0.4 | −10.5 | −21.9 |
| Comparative Example 3 | 7.6 × 10⁻⁴ | 1.79 | 51 | 83 | 0.49 | −0.8 | −11.2 | −21.4 |
| Comparative Example 4 | 9.1 × 10⁻⁴ | 0.93 | 56 | 68 | 0.68 | −0.6 | −10.2 | −22.1 |
| Comparative Example 5 | 22.6 × 10⁻⁴ | 1.09 | 12 | 85 | 0.41 | −3.0 | −11.7 | −22.4 |
| Comparative Example 6 | 8.4 × 10⁻⁴ | 1.10 | 45 | 88 | 0.50 | −0.9 | −9.9 | −21.6 |
| Comparative Example 7 | 7.6 × 10⁻⁴ | 1.46 | 55 | 81 | 0.48 | −0.9 | −10.1 | −20.7 |

TABLE 1-continued

| | Parameters regarding the electric properties | Parameters regarding the surface topography | | | | | |
|---|---|---|---|---|---|---|---|
| | | Total volume of convexities | | | | | |
| | Change rate over time of $\tan\delta/\tan\delta_0$ | having a height of 0.4 μm or greater per 1 mm² | Elliptical shape density | Maximum convexity height (Sp) | Change in the electrostatic capacitance ΔC [%] | | |
| | [1/hour] | Δ (tanδ) | [μm³/mm²] | [/mm²] | [μm] | 500 [h] | 1000 [h] | 1500 [h] |
| Comparative Example 8 | 5.1 × 10⁻⁴ | 0.63 | 52 | 81 | 0.55 | −0.5 | −6.8 | −20.5 |
| Comparative Example 9 | 6.8 × 10⁻⁴ | 0.62 | 27 | 43 | 0.51 | −0.8 | −8.9 | −21.7 |
| Comparative Example 10 | 12.3 × 10⁻⁴ | 0.80 | 50 | 72 | 0.57 | −0.7 | −10.2 | −22.7 |

TABLE 2

| | tanδ [%] of capacitor element | | | | | | | |
|---|---|---|---|---|---|---|---|---|
| | 0 [h] | 100 [h] | 200 [h] | 300 [h] | 400 [h] | 500 [h] | 1000 [h] | 1500 [h] |
| Example 1 | 1.00 | 1.03 | 1.05 | 1.07 | 1.10 | 1.20 | 2.98 | 2.95 |
| Example 2 | 1.00 | 1.02 | 1.05 | 1.08 | 1.09 | 1.23 | 3.25 | 2.92 |
| Example 3 | 1.00 | 1.04 | 1.05 | 1.06 | 1.09 | 1.12 | 1.32 | 2.45 |
| Example 4 | 1.00 | 1.02 | 1.03 | 1.04 | 1.13 | 1.26 | 3.23 | 2.78 |
| Example 5 | 1.00 | 1.04 | 1.06 | 1.08 | 1.13 | 1.25 | 3.08 | 2.95 |
| Example 6 | 1.00 | 1.04 | 1.06 | 1.09 | 1.16 | 1.16 | 2.99 | 2.69 |
| Example 7 | 1.00 | 1.03 | 1.02 | 1.05 | 1.07 | 1.09 | 1.35 | 2.59 |
| Example 8 | 1.00 | 1.02 | 1.03 | 1.07 | 1.13 | 1.26 | 3.05 | 2.61 |
| Example 9 | 1.00 | 1.03 | 1.05 | 1.09 | 1.14 | 1.22 | 1.42 | 3.13 |
| Comparative Example 1 | 1.00 | 1.06 | 1.09 | 1.25 | 1.45 | 2.03 | 2.95 | 2.25 |
| Comparative Example 2 | 1.00 | 1.06 | 1.07 | 1.12 | 1.25 | 1.52 | 3.23 | 2.23 |
| Comparative Example 3 | 1.00 | 1.02 | 1.04 | 1.12 | 1.25 | 1.38 | 3.81 | 2.02 |
| Comparative Example 4 | 1.00 | 1.01 | 1.03 | 1.10 | 1.29 | 1.46 | 3.21 | 2.28 |
| Comparative Example 5 | 1.00 | 1.09 | 1.18 | 1.32 | 1.82 | 2.12 | 2.89 | 2.42 |
| Comparative Example 6 | 1.00 | 1.04 | 1.09 | 1.14 | 1.24 | 1.46 | 3.64 | 2.54 |
| Comparative Example 7 | 1.00 | 1.06 | 1.10 | 1.13 | 1.21 | 1.43 | 3.91 | 2.45 |
| Comparative Example 8 | 1.00 | 1.04 | 1.07 | 1.13 | 1.16 | 1.27 | 3.91 | 3.27 |
| Comparative Example 9 | 1.00 | 1.03 | 1.07 | 1.10 | 1.27 | 1.33 | 2.86 | 2.24 |
| Comparative Example 10 | 1.00 | 1.04 | 1.05 | 1.16 | 1.46 | 1.59 | 3.52 | 2.72 |

As shown in Table 1 and 2, the biaxially stretched polypropylene film for capacitor of the present invention can suppress an increase in tan δ and a decrease in the electrostatic capacitance even when the capacitor, which comprises a film, is used at a high voltage and at a high temperature for a long duration.

The invention claimed is:

1. A biaxially stretched polypropylene film for capacitors having a change rate over time of tan δ/tan $\delta_0$ of $5.0\times10^{-4}$ [1/hour] or less, wherein tan δ/tan $\delta_0$ is a value of tan δ normalized by a value of tan $\delta_0$, tan δ [%] is a value measured at an elapsed time of between 0 hour and 500 hours, and tan $\delta_0$ [%] is an initial value measured at an elapsed time of 0 hour, in a long-term durability test at 105° C. and under an applied voltage of 600 V, wherein the maximum height of convexities is 0.5 μm or greater and 0.9 μm or less on the at least one of the surfaces of the polypropylene film, and wherein an elliptical shape density is 60/mm² or greater and 101/mm² or less on at least one of the surfaces of the polypropylene film.

2. The polypropylene film according to claim 1, wherein a total volume of convexities having a height of 0.4 μm or greater is 50 μm³ or greater and 150 μm³ or less per 1 mm² on at least one of the surfaces of the polypropylene film.

3. The polypropylene film according to claim 1 having Δ(tan δ) of −10.0 or greater and 0.50 or less, wherein Δ(tan δ) is a difference obtained by subtracting a value of tan δ/tan $\delta_0$ measured at an elapsed time of 1500 hour from a maximum of tan δ/tan $\delta_0$ measured before an elapsed time of 1500 hours, and tan δ/tan $\delta_0$ is a value of tan δ [%] measured at an elapsed time of 0 hour to 1500 hours normalized by a value of tan $\delta_0$ [%] measured at an elapsed time of 0 hour in the long-term durability test.

4. The polypropylene film according to claim 1, wherein the polypropylene film comprises a polypropylene resin A having a molecular weight distribution (Mw/Mn) of 7.5 or greater and 12.0 or less.

5. The polypropylene film according to claim 4, wherein a difference obtained by subtracting a differential distribution value at a logarithmic molecular weight Log(M) of 6.0 from a differential distribution value at Log(M) of 4.5 in a differential molecular weight distribution curve of the polypropylene resin A is 11.2% or greater and 18.0% or less.

6. The polypropylene film according to claim 1, wherein the polypropylene film has a thickness of 1.0 μm or greater and 6.0 μm or less.

7. The polypropylene film according to claim 1, wherein the maximum height of convexities is 0.5 μm or greater and 0.82 μm or less on the at least one of the surfaces of the polypropylene film.

8. The polypropylene film according to claim 7, wherein the maximum height of convexities is 0.5 μm or greater and 0.78 μm or less on the at least one of the surfaces of the polypropylene film.

9. A metallized film comprising the polypropylene film described in claim 1 and a metal coating on one or both surfaces of the polypropylene film.

10. A capacitor comprising the biaxially stretched polypropylene film described in claim 1.

* * * * *